(12) United States Patent
Varma

(10) Patent No.: US 12,744,380 B2
(45) **Date of Patent: *Sep. 22, 2026**

(54) UTILIZATION OF DISTRIBUTED GENERATOR INVERTERS AS STATCOM

(71) Applicant: Rajiv Kumar Varma, London (CA)

(72) Inventor: Rajiv Kumar Varma, London (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/345,502

(22) Filed: Sep. 30, 2025

(65) Prior Publication Data

US 2026/0031623 A1 Jan. 29, 2026

Related U.S. Application Data

(60) Continuation of application No. 18/340,645, filed on Jun. 23, 2023, now abandoned, which is a
(Continued)

(51) Int. Cl.
*H02J 3/01* (2026.01)
*H02J 3/1842* (2026.01)
(Continued)

(52) U.S. Cl.
CPC .............. *H02J 3/01* (2013.01); *H02J 3/1842* (2013.01); *H02J 3/381* (2013.01); *H02J 3/388* (2020.01);
(Continued)

(58) Field of Classification Search
CPC ........... H02J 50/12; H02J 50/40; H01F 27/00; H01F 38/00
See application file for complete search history.

(56) References Cited

U.S. PATENT DOCUMENTS

2009/0200994 A1 * 8/2009 Fornage .................... H02J 3/18 307/45

FOREIGN PATENT DOCUMENTS

WO WO-2009145380 A1 * 12/2009 ............ H02J 3/1842

OTHER PUBLICATIONS

Patel, Viralkumar, Patel, Jatinkumar, Power Quality Improvement of Grid Using Solar Photovoltaic Farm, 2017, International Conference on Innovations in Power and Advanced Computing Technologies [i-PACT2017], pp. 1-6 (Year: 2017).*
(Continued)

*Primary Examiner* — Rexford N Barnie
*Assistant Examiner* — Joseph N Inge
(74) *Attorney, Agent, or Firm* — Kimberly A Peaslee

(57) ABSTRACT

A method and system for controlling a photovoltaic solar power generation source operatively coupled to a power grid system at a point of common coupling (PCC) to perform a plurality of dynamic reactive power control based functions including: reactive power set point control, power factor control, and voltage control, when its primary energy source is not available, and available. Voltage control may also prevent PCC voltage from violating a voltage limit caused by real power generation from itself or by real power generation from an additional distributed power generation source operatively connected to said power grid system, or by both. Controlling a battery energy storage based distributed power generation source operatively coupled to a power grid system at a PCC to perform reactive power set point control, power factor control, and voltage control, during both the conditions when its primary energy source is not available, and available is also provided.

12 Claims, 13 Drawing Sheets

Related U.S. Application Data continuation-in-part of application No. 17/543,182, filed on Dec. 6, 2021, now Pat. No. 11,784,496, which is a continuation-in-part of application No. 16/280,756, filed on Feb. 20, 2019, now Pat. No. 11,211,799, which is a division of application No. 15/072,014, filed on Mar. 16, 2016, now Pat. No. 10,256,635, which is a continuation of application No. 13/391,699, filed as application No. PCT/CA2010/001419 on Sep. 15, 2010, now Pat. No. 9,325,173.

(60) Provisional application No. 61/309,612, filed on Mar. 2, 2010, provisional application No. 61/242,501, filed on Sep. 15, 2009.

(51) Int. Cl.

*H02J 3/38* (2026.01)
*H02J 3/388* (2026.01)
*H02J 3/40* (2026.01)
*H02J 9/00* (2006.01)
*H02J 101/24* (2026.01)
*H02M 7/44* (2006.01)

(52) U.S. Cl.

CPC .................. *H02J 3/40* (2013.01); *H02J 9/00* (2013.01); *H02M 7/44* (2013.01); *H02J 2101/24* (2026.01); *Y02E 10/56* (2013.01); *Y02E 40/10* (2013.01); *Y02E 40/20* (2013.01); *Y02E 40/40* (2013.01)

(56) References Cited

OTHER PUBLICATIONS

Solanki, Niraj, Patel, Jatinkumar, Utilization of PV Solar Farm for Grid Voltage Regulation during Night; Analysis & Control, 2016, IEEE Internation Conference on Power Electronics, Intelligent Control and Energy Systems (ICPEICES-2016), pp. 1-5 (Year: 2016).*

* cited by examiner

VR: Voltage Regulation, Aux. Ctrl.: Auxiliary Control (i.e., Damping control), LRPC: Load Reactive Power Compensation, HC: Harmonic Compensation API: Active Power Injection, VR: Voltage Regulation, Aux. Ctrl.: Auxiliary Control, LRPC: Load Reactive Power Compensation, HC: Harmonic Compensation (a)

(b)

Typical Gearless Wind Turbine-Generator-Rectifier (T-G-R) Model

UTILIZATION OF DISTRIBUTED GENERATOR INVERTERS AS STATCOM

RELATED APPLICATIONS

This application is a Continuation of U.S. application Ser. No. 18/340,645 filed Jun. 23, 2023, which is a Continuation-in-Part of U.S. application Ser. No. 17/543,182 filed Dec. 6, 2021 and granted on Oct. 10, 2023 as U.S. Pat. No. 11,784,496, which is a Continuation-in-Part of U.S. application Ser. No. 16/280,756 filed Feb. 20, 2019 and granted on Dec. 28, 2021 as U.S. Pat. No. 11,211,799, which is a Divisional of U.S. application Ser. No. 15/072,014 filed Mar. 16, 2016 and granted on Apr. 9, 2019 as U.S. Pat. No. 10,256,635, which is a Continuation of U.S. application Ser. No. 13/391,699 filed May 7, 2012 and granted on Apr. 26, 2016 as U.S. Pat. No. 9,325,173, which is a US National Stage (371) of PCT/CA2010/001419 filed Sep. 15, 2010, which claims the benefit of U.S. Provisional Application Nos. 61/242,501 and 61/309,612 filed on Sep. 15, 2009 and Mar. 2, 2010, respectively, each of which are herein incorporated by reference in their entirety.

TECHNICAL FIELD

The present invention relates to distributed power generation systems. More particularly, the present invention relates to the use of solar farm inverters and wind turbine generator inverters as Flexible Alternating Current (AC) Transmission Systems (FACTS) controller—static synchronous compensator (STATCOM).

BACKGROUND

Due to ever-increasing energy demands, depletion of fossil fuel, and environmental constraints, the interest in generating green energy at all levels is at an all time peak. Worldwide, governmental incentives and subsidy programs are attracting several customers to install small capacity (ranging from few watts to few kW) renewable energy modules in their premises. Similarly, large companies are building PV solar farms ranging from few hundred kW to few MW or higher capacity. Distributed generation (DG)—power sources connected at one or more locations within the distribution system have brought new issues and problems to the existing power system.

The penetration level of DG systems, such as renewable-energy based DG systems, is growing. As such, the utility companies are facing major challenges of grid-integrating these increasing number sources of power. Challenges such as ensuring voltage regulation, system stability and power quality within standard limits, are at the forefront of these problems.

FACTS devices offer a viable solution to this problem and are being increasingly employed in power systems worldwide. FACTS are defined here as alternating current transmission systems incorporating power-electronic based and other static controllers to enhance controllability and increase power transfer capability. FACTS devices are typically utilized for accomplishing the following objectives:

- Voltage control
- Increase/control of power transmission capacity in a line, and for preventing loop flows
- Improvement of system transient stability limit
- Enhancement of system damping
- Mitigation of sub-synchronous resonance
- Alleviation of voltage instability
- Limiting short circuit currents
- Improvement of HVDC converter terminal performance
- Grid Integration of Wind Power Generation Systems Some of the devices/controllers in the family of the FACTS devices that have been used for achieving any or all of the above objectives are Static Var Compensators (SVC) and Static Synchronous Compensators (STATCOM), etc.

A static synchronous compensator (STATCOM) is a shunt connected reactive power compensation device that is capable of generating and/or absorbing reactive power whose output can be varied to control specific parameters of an electrical power system. In general terms, a STATCOM is a solid-state switching converter that is capable of independently generating or absorbing controllable real and reactive power at its output terminals when it is fed from an energy source or an energy storage device at its input terminals.

More specifically, the STATCOM is a voltage source converter that produces from a given input of direct current (DC) voltage a set of three-phase AC output voltages. Each output voltage is in phase with and is coupled to the corresponding AC system voltage through a relatively small reactance (which can be provided either by an interface reactor or leakage inductance of a coupling transformer). The DC voltage is provided by a capacitor.

It is also known in the prior art that a STATCOM provides desired reactive power generation, as well as power absorption, by means of electronic processing of voltage and current waveforms in a voltage source converter (VSC). The STATCOM also provides voltage support by generating or absorbing reactive power at the point of common coupling (PCC) without the need for large external reactors or capacitor banks. Therefore, the STATCOM occupies a much smaller physical footprint.

For purposes of this document, a converter is a general name for both rectifiers and inverters.

It also known that a STATCOM can improve power system performance in areas such as:

- Voltage control
- Increase/control of power transmission capacity in a line, and for preventing loop flows
- Improvement of system transient stability limit
- Enhancement of system damping
- Mitigation of sub-synchronous resonance
- Alleviation of voltage instability
- Limiting short circuit currents
- Improvement of HVDC converter terminal performance
- Grid Integration of Wind Power Generation Systems
- Voltage flicker control; and
- Control of reactive power and also, if needed, active power in the connected line (this configuration requires a DC energy source).s The reactive and real power exchange between the STATCOM and the AC system can be controlled independently of one other. Any combination of the real power generation/absorption together with reactive power generation/absorption is achievable, if the STATCOM is equipped with an energy storage device of suitable capacity. With this capability, some extremely effective control strategies for the modulation of the reactive and real output power can be devised to improve the transient and dynamic system stability limits.

The increasing penetration level of DG systems in modern power transmission and distribution systems is presenting several technical challenges. One of these challenges is the voltage variation along the feeder. Traditionally, the direction of electrical power flow has been from the grid towards the loads connected in the distribution feeders. The voltage drops over the feeder length was tackled effectively by adjusting the sending end voltage magnitude or by providing reactive power support at one or more locations in the transmission/distribution feeders. To maintain the voltage at different locations within the standard limits, the utility companies traditionally use a combination of on-line tap changing transformers, and capacitor banks at different locations.

A DG system dominated by wind farms, however, may exhibit an interesting condition, especially at night. At this time, the electrical loads are much lower than their day-time values, given that the wind turbine generator outputs are much higher due to high wind speeds in the night compared to day. This increased power generated from wind farms at night can cause significant amount of power to flow in the reverse direction towards the main grid. Since the present power distribution systems were designed and operated with an important assumption of power always flowing from main grid towards the end users, this reverse power flow condition causes the feeder voltages to rise above their normal rated values. In certain cases, this increase in voltage can exceed the typically allowable limit of ±5%. This is not acceptable to electric utilities.

The problem of reverse power flow presents a major challenge when adding more DG systems to a feeder line. Maintaining the voltage rise within the specified range directly affects the number of DG systems that can be connected on a particular distribution network. When adding additional wind farms to a network, utilities may be forced to install expensive voltage regulating devices in the family of FACTS controllers, such as an SVC or a STATCOM to mitigate this problem.

In light of the above, there is a need for a system, method, and/or device for adapting existing DG systems to support the addition of wind farms and other DG sources without requiring expensive voltage regulation devices.

SUMMARY

The present invention provides a solution to this problem by utilizing PV solar farms as not only a source of real power but also a source of dynamically controllable reactive power. Real power is also referred to as active power.

STATCOM is a reactive power compensator, and is a Flexible AC Transmission System (FACTS) Controller or FACTS device (see [1] and [2])

As described in [1] and [2], a static synchronous compensator (STATCOM) is a shunt connected reactive power compensation device that is capable of generating and/or absorbing reactive power whose output can be varied to control specific parameters of an electrical power system. A STATCOM does not include any energy storage device.

As also described in [1] and [2], a STATCOM provides dynamic reactive power compensation. A STATCOM also provides dynamic voltage control. The closed loop response time of a STATCOM is typically 1-2 cycles.

As further described in [1] and [2], if a STATCOM is equipped with an energy storage device at its input dc terminals, it becomes capable of independently generating or absorbing controllable real and reactive power at its output AC terminals.

In particular, the invention provides a method of operating a solar farm inverter primarily as a STATCOM during the night to mitigate the high voltages caused by the addition of wind farms to a DG system. The present invention demonstrates that a solar farm inverter can be effectively utilized to regulate the voltage at point of common coupling (PCC)—the location where the wind farm is integrated. Furthermore, at nighttime, the solar farm can be utilized to achieve all the possible functions of a STATCOM for improving the power system performance by increasing system stability, damping power system oscillations, alleviating voltage instability, suppressing subsynchronous resonance, etc. It can also be utilized to provide load reactive power support/compensation, perform load balancing, and/or neutralize load current harmonics.

The concepts of stability, power oscillation damping, voltage stability, subsynchronous resonance are explained in [3]. The updated definitions of different forms of stability are described in [4].

The entire rating of the solar farm inverter is available for accomplishing the above functions, since the solar farm is absolutely idle and not producing real power at night times as the sun is absent. During the daytime when power generation from the solar farm is not at a peak (such as during early morning and late afternoon hours), the remaining solar farm inverter capacity can be utilized to perform any or all of the above mentioned STATCOM functions.

At any time during the day, the power output of the solar farm inverter is not curtailed to perform any or all of the above mentioned STATCOM functions.

In a further embodiment, the present invention further provides an auxiliary controller having a plurality of modes of operation. The controller is capable of performing voltage regulation, during the night-time and day-time operation of the DG systems.

In addition, the present invention includes a further embodiment of providing a voltage controller and an auxiliary damping controller. The voltage controller and the damping controller operate with the inverter based solar DG connected to the grid or the inverter-based wind DG connected to the grid. This further embodiment improves the transient stability of the DG system both in the night and the daytime whenever there is an availability of reactive power capacity in the DG system.

In a first aspect, the present invention provides a distributed power generation source, for operatively connecting to a distributed power generation network at a point of common coupling, said distributed power generation source comprising:

- a voltage inverter
- a control means that operates said voltage inverter, wherein a voltage at said point of common coupling is regulated by the control means, as a static synchronous compensator (STATCOM), when said distributed power generation source is providing less than its maximum rated active power to said network, wherein said STATCOM prevents said voltage at said point of common coupling from exceeding a voltage rating when at least one more additional distributed power generation sources being operatively connected to said network produces an excess amount of power relative to an amount of power required by one or more loads on said network.

In a second aspect, the present invention provides a control system for use in controlling a distributed generation (DG) power source having multiple functions relating to a power transmission system, the system comprising:

- a master control unit producing a digital control word, said control word having distinct sections; and
- a plurality of control modules, each control module being for producing values for use in a different function of said DG power source, said values being used to produce a signal proportional to a signal required by said different function;

wherein each control module receives at least a portion of said digital control word; and wherein each control module is activated and deactivated by a specific distinct section of said digital control word.

In a third aspect, the present invention provides a system for improving transient stability of a power transmission system line, the system comprising:

a power source having an output being injected on to said transmission system;

a damping controller receiving as input a signal indicative of oscillations in of said power transmission system and outputting a damping control signal a control system receiving said damping control signal;

wherein said control system outputs a magnitude control signal proportional to a transient signal on said transmission system line; and wherein said magnitude control signal controls said power source such that said output is based on said magnitude control signal.

In a fourth aspect, the present invention provides a method for operating an energy farm, said energy farm being connected to a power transmission system, said energy farm being equipped with an inverter, the method comprising:

operating said energy farm as a static synchronous compensator (STATCOM) using said inverter increasing the transmission capacity of said transmission system using said inverter charging users of said transmission system for an increase in said transmission capacity of said transmission system.

In a fifth aspect, the present invention provides a method for operating a solar energy farm, said solar energy farm being connected to a power transmission system shared with at least one other energy farm, said energy farm being equipped with an inverter, the method comprising:

coupling said solar energy farm to at least one other energy farm operating said solar energy farm as a static synchronous compensator (STATCOM) using said inverter controlling a voltage on said power transmission system using said inverter charging users of said transmission system for using said inverter as a voltage regulating device on said transmission system.

In a sixth aspect, the present invention provides a control system for use in controlling an energy storage based distributed power generation source operatively coupled to a power grid system at a point of common coupling (PCC), said control system consisting of: a single voltage inverter provided within said energy storage based distributed power generation source and enabling said energy storage based distributed power generation source to perform a plurality of static synchronous compensator (STATCOM) functions including: i) reactive power compensation, ii) voltage control to prevent a voltage at said PCC from violating a voltage limit, iii) power oscillation damping, and iv) damping of subsynchronous oscillations; when said energy storage based distributed power generation source is performing at least one of: i) not exchanging active power with said power grid system, or ii) exchanging active power with said power grid system where said active power is less than a maximum inverter capacity.

In a seventh aspect, the present invention provides a control system for use in controlling an energy storage based distributed power generation source operatively coupled to a power grid system at a point of common coupling (PCC), said control system consisting of: a single voltage inverter provided within said energy storage based distributed power generation source and enabling said energy storage based distributed power generation source to perform a plurality of static synchronous compensator (STATCOM) functions including: i) reactive power compensation, ii) voltage control to prevent a voltage at said PCC from violating a voltage limit, iii) power oscillation damping, and iv) damping of subsynchronous oscillations; when said energy storage based distributed power generation source is performing at least one of: i) not exchanging active power with said power grid system, or ii) exchanging active power with said power grid system where said active power is less than a maximum inverter capacity.

At any time, the active power exchange of the energy storage based distributed power generation source is not curtailed to perform any or all of the above mentioned STATCOM functions.

In a further aspect, the present invention provides a control system for use in controlling an inverter based power generation source operatively coupled to a power grid system at a point of common coupling (PCC), said inverter based power generation source comprising at least one inverter, said control system enabling said inverter based power generation source to provide at least one of a plurality of static synchronous compensator (STATCOM) functions to said power grid system when said inverter based power generation source is performing at least one of:

i) not providing active power to said power grid system; or ii) providing active power to said power grid system where said active power is less than a maximum inverter capacity;

wherein said plurality of STATCOM functions includes:

i) power oscillation damping; and ii) damping of subsynchronous oscillations;

wherein said inverter-based power generation source is a photovoltaic solar farm;

wherein the power grid system is at least one of:

i) a power transmission system, ii) a power distribution system, iii) a microgrid system, or iv) any combination of the above.

Yet a further aspect of the present invention provides a control system for use in controlling an inverter based power generation source operatively coupled to a power grid system at a point of common coupling (PCC), said inverter based power generation source comprising at least one inverter, said control system enabling said inverter based power generation source to provide at least one of a plurality of static synchronous compensator (STATCOM) functions to said power grid system, said plurality of STATCOM functions including:

i) reactive power compensation, and ii) voltage control;

wherein said at least one of a plurality of STATCOM functions is provided to said power grid system when said inverter based power generation source is performing at least one of:

i) not providing active power to said power grid system, and when at least one other distributed power generation source also operatively connected to said power grid system produces an amount of power that is in excess of power required by one or more loads coupled to said power grid system, said at least one other distributed power generation source being different from said inverter-based power generation source; or ii) providing active power to said power grid system where said active power provided is less than a maximum inverter capacity, and when at least one of:

a) said inverter-based power generation source produces an amount of power that is in excess of power required by one or more loads coupled to said power grid system, or b) one other distributed power generation source also operatively connected to said power grid system produces an amount of power that is in excess of power required by one or more loads coupled to said power grid system, said at least one other distributed power generation source being different from said inverter-based power generation source;

wherein said inverter-based power generation source is a photovoltaic solar farm;

wherein the power grid system is at least one of:

i) a power transmission system, ii) a power distribution system, iii) a microgrid system, or iv) any combination of the above.

BRIEF DESCRIPTION OF THE DRAWINGS

The embodiments of the present invention will now be described by reference to the following figures, in which identical reference numerals in different figures indicate identical elements and in which.

Figure 1:
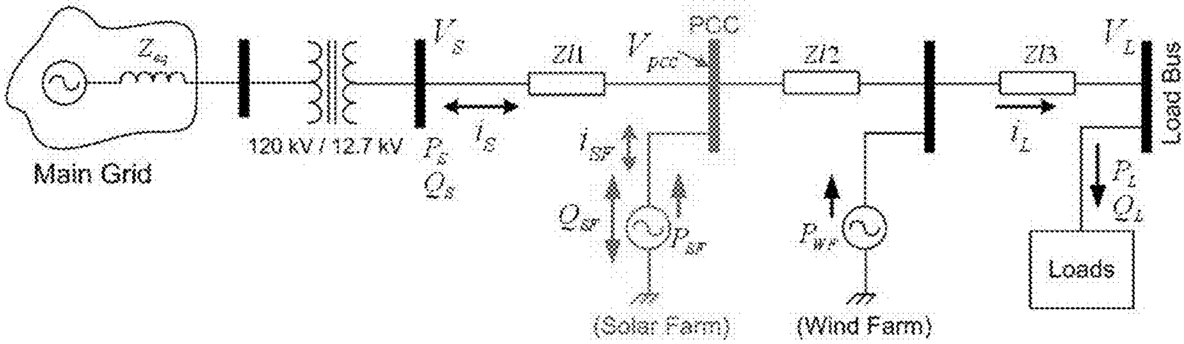
FIG. 1 shows a system block diagram representation of an embodiment of the present invention.

The Figures are not to scale, and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

Generally speaking, the systems described herein are directed to a method of regulating the voltage in a DG system using a solar farm inverter as a STATCOM, especially during nighttime. As required, embodiments of the present invention are disclosed herein. However, the disclosed embodiments are merely exemplary, and it should be understood that the invention may be embodied in many various and alternative forms. For purposes of teaching and not limitation, the illustrated embodiments are directed to a method of regulating the voltage in a DG system using a solar farm inverter as a STATCOM.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

The present invention allows solar farm inverters to be controlled as a STATCOM in the night when there is no sunlight. When used as a STATCOM at night, the entire rating/capacity of solar farm inverter is employed to provide several benefits to the power system as normally provided by the FACTS technology. During daytime (especially during partial sun, i.e., in early mornings and late afternoons) all the capacity of the solar farm inverter remaining after that required for real power generation is utilized to be controlled as STATCOM. Such an approach allows for a new set of applications and potential revenue earning methods for solar farms other than simply producing real power during the day.

The present invention also allows wind turbine generator inverters (especially for wind turbine generators based on inverter technology) to be controlled as STATCOM during hours when there is no wind. When wind is absent, the entire rating/capacity of the wind turbine inverters are employed to provide several benefits to the power system as normally provided by the FACTS technology. During other times (especially during less wind regime), all the capacity of the wind turbine inverters remaining after that required for real power generation, is utilized to be controlled as STATCOM. This opens up a new set of applications and potential revenue earning to the wind farms than simply from producing real power.

While the potential applications of PV solar farm as STATCOM (FACTS device) are several, the following description illustrates two major benefits of solar farm utilization as STATCOM: 1) integrating more wind power systems in the transmission/distribution networks by providing voltage control on the network, and ii) increasing the stable power transfer limit on transmission systems through both voltage control and auxiliary damping control.

While the potential applications of wind farm as STATCOM (FACTS device) utilizing auxiliary controls are several, the following description shows one major benefit of wind farm utilization as STATCOM: increasing the stable power transfer limit on transmission systems through both voltage control and auxiliary damping control.

The utilization of solar farm inverters and wind farm inverters as STATCOM is applicable regardless of the following: 1) type and configuration of inverter e.g., 6 pulse, 12 pulse, multilevel, etc, 2) type of semiconductor switches used is inverters, e.g. GTO, IGBT, etc, 3) type of firing methodology used, PWM, SPWM, hysteresis control, PLL based, etc., 4) methodology of controller design, e.g., pole placement, lead lag control, genetic algorithm based control, etc, 5) choice of auxiliary control signals, e.g., local signals such as line current magnitude, active power flow, local bus frequency, remote signals such as phasor measurement unit (PMU) acquired signals, etc.

Table 1 below provides an explanation for the various terms and notation used in different figures and in the description below.

| Symbol | Description |
|---|---|
| $v_{PCC,a} = v_{PCC,a}(\omega t)$ | Instantaneous phase-a voltage at PCC |
| $v_{PCC,b} = v_{PCC,b}(\omega t)$ | Instantaneous phase-b voltage at PCC |
| $v_{PCC,c} = v_{PCC,c}(\omega t)$ | Instantaneous phase-c voltage at PCC |
| $V_m$ | Peak magnitude of rated voltage at PCC |
| $V_{PCC}$ | Peak value of actual voltage at PCC |
| $V^*_{PCC}$ | Peak value of reference (desired) voltage at PCC |
| $V_{dc}$ | Actual DC bus voltage |
| $V^*_{dc}$ | Reference (desired) DC bus voltage |
| $I_v$ | Required magnitude of current to achieve PCC voltage control |
| $I_{DC}$ | Required magnitude of current to achieve DC bus voltage control |
| $i_{va} = i_{va}(\omega t)$ | Instantaneous phase-a reference current for PCC voltage control |
| $i_{vb} = i_{vb}(\omega t)$ | Instantaneous phase-b reference current for PCC voltage control |
| $i_{vc} = i_{vc}(\omega t)$ | Instantaneous phase-c reference current for PCC voltage control |
| $i_{dc,a} = i_{dc,a}(\omega t)$ | Instantaneous phase-a reference current for DC bus voltage control |
| $i_{dc,b} = i_{dc,b}(\omega t)$ | Instantaneous phase-b reference current for DC bus voltage control |
| $i_{dc,c} = i_{dc,c}(\omega t)$ | Instantaneous phase-c reference current for DC bus voltage control |
| $i^*_{SF,a} = i^*_{SF,a}(\omega t)$ | Net instantaneous phase-a reference current for SF-inverter control |
| $i^*_{SF,b} = i^*_{SF,b}(\omega t)$ | Net instantaneous phase-b reference current for SF-inverter control |
| $i^*_{SF,c} = i^*_{SF,c}(\omega t)$ | Net instantaneous phase-c reference current for SF-inverter control |
| $U_a$ | Phase-a PCC voltage in per unit (pu) form |
| $U_b$ | Phase-b PCC voltage in pu form |
| $U_c$ | Phase-c PCC voltage in pu form |
| k | Voltage gain to convert actual PCC voltages to pu value |
| $k_v$ | Voltage gain to convert pu value to actual value |
| $k_{DC}$ | Voltage gain to convert pu value to actual value |
| Cdc | DC link capacitor |
| Lsh | Interfacing series inductor |
| S1 to S6 | Insulated Gate Bipolar Transistors (IGBTs) |
| G1 to G6 | Gate switching pulses to turn ON/OFF the IGBTs |
| Capital Letters | Peak/Average/DC or Root mean-square (rms) values (Ex. $V_{PCC}$; $V_{dc}$) |
| Small Letters | Instantaneous values which vary with time (Ex. $v_{PCC,a}$; $i^*_{SF,a}$) |

The present invention provides a method for utilizing a solar farm inverter as a source of both real and reactive power to support the growth of DG systems. The invention makes use of the fact that the solar farm inverter is unutilized during night-time. Additionally, when the solar farm is not producing power up to its rated generation capacity, the present invention can also be applied during the daytime. For approximately 60% of the daytime (8 hours out of 13 hours of daylight), the solar farm inverter capacity is remains underutilized (i.e. inverter capacity is utilized below 75% of its rated capacity). This underutilized inverter capacity can therefore be gainfully employed to achieve the similar functionality as of night-time at, however, a limited scale. For ease of understanding hereafter, the operating modes of the present invention are addressed as night-time mode of operation (or simply "night-time") and day-time mode of operation (or simply "daytime").

The present document refers to a photovoltaic (PV) solar farm. However, the skilled artisan will understand that the present invention is not limited to this type of solar system but can be used with any distributed power generation source having a voltage inverter may be utilized.

The spare available solar PV inverter capacity thus can be utilized to solve several known problems in DG systems. The present invention provides several embodiments in which maximum benefits from the solar farm inverter can be realized. Table 2 highlights the proposed applications of the solar farm during both modes of operation. Furthermore, some of these applications can be integrated to achieve multiple tasks simultaneously.

TABLE 2

Some Modes of Operation of a Solar Farm
Modes Of Operation

| I. Night-Time Operation | II. Day-Time Operation |
|---|---|
| PCC Voltage Regulation | Active Power Injection |
| Auxiliary/Damping control | PCC Voltage Regulation |
| Load Reactive Power Compensation | Auxiliary/Damping control |
| Power Quality Enhancement | Load Reactive Power Compensation |
| Load and/or Network Balancing | Power Quality Enhancement |
| Battery Charging | Load and/or Network Balancing |

FIG. 1 illustrates the single-line representative diagram of the exemplary system. This system is comprised of a wind farm and a PV solar farm. The distances between different points of interest are represented by equivalent line impedances, such as, $Z_{l1}$, $Z_{l2}$, etc. For simplicity, the loads on the system are combined together, considered at the end of the feeder and represented by equivalent MW and MVar.

Figure 2:
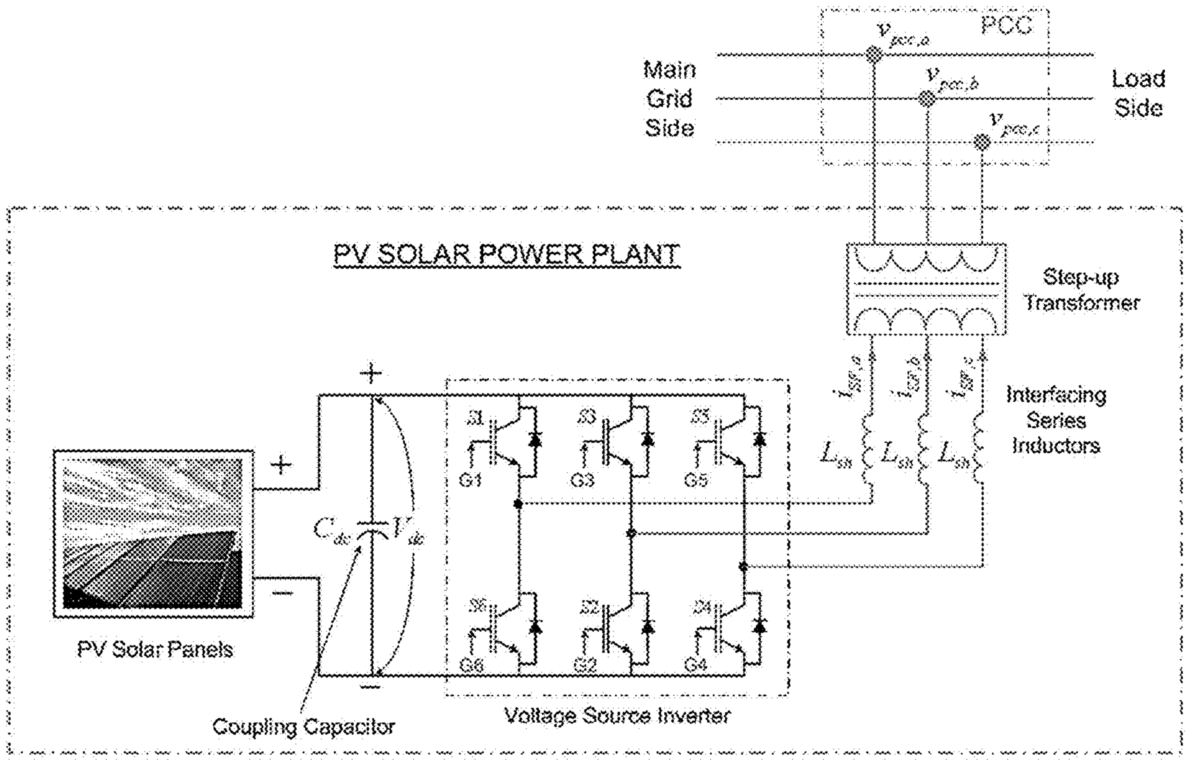
FIG. 2 shows a detailed representation of a Photovoltaic (PV) solar farm.

FIG. 2 is a detailed PV solar farm schematic, modeled as a voltage source inverter with a DC bus capacitor. The voltage source inverter is realized by utilizing six semiconductor switches (here, Insulated Gate Bipolar Transistors (IGBTs)). It may be understood that there are several types/configurations of voltage source converters/inverters. However, the invention applies to any type/configuration of the inverter. The inverter is connected to the network through interfacing series inductors and a step-up transformer. The point at which the PV solar farm is connected to the feeder/network is termed as point of common coupling (PCC). The currents injected/delivered by the PV solar farm are denoted as $i_{SF,a}$, $i_{SF,b}$ and $i_{SF,c}$.

As mentioned earlier, the present invention seeks to increase the real power injection capability of the wind farm, especially during the night-time when wind farms generally produce more power than in the daytime. When the power generated by the wind farm is greater than the loads connected downstream of the wind farm, the remaining excess power flows towards the main grid. This reverse power flow causes the feeder voltage to rise. If the amount of the reverse power flow is significantly high, the feeder voltage level may increase beyond the accepted limit imposed by the utility (such as ±5% of the rated feeder voltage). If such an event occurs (i.e., feeder voltage more than 1.05 per unit due to reverse power flow), the wind farm has to shut down or its output power injection needs to be reduced.

Accordingly, the present invention uses the unutilized PV solar farm inverter (during night-time) to control the feeder voltage during such an event. The PV solar inverter controls and thus restores the increased feeder voltage back to the acceptable limit by injecting the appropriate amount of controlled reactive power.

Generally, a capacitor is connected on the DC side of the solar inverter. In the present invention, the voltage across this capacitor (referred to hereafter as the DC link voltage/DC bus voltage) is maintained at a reference value by taking a small amount of active power from the grid. Inclusion of a self-supporting DC bus feature in a PV solar farm, especially during the night-time, is required. This enables the PV solar farm to perform as a STATCOM.

This section describes the operating principle of using a PV solar farm to regulate the PCC voltage.

Figure 3:
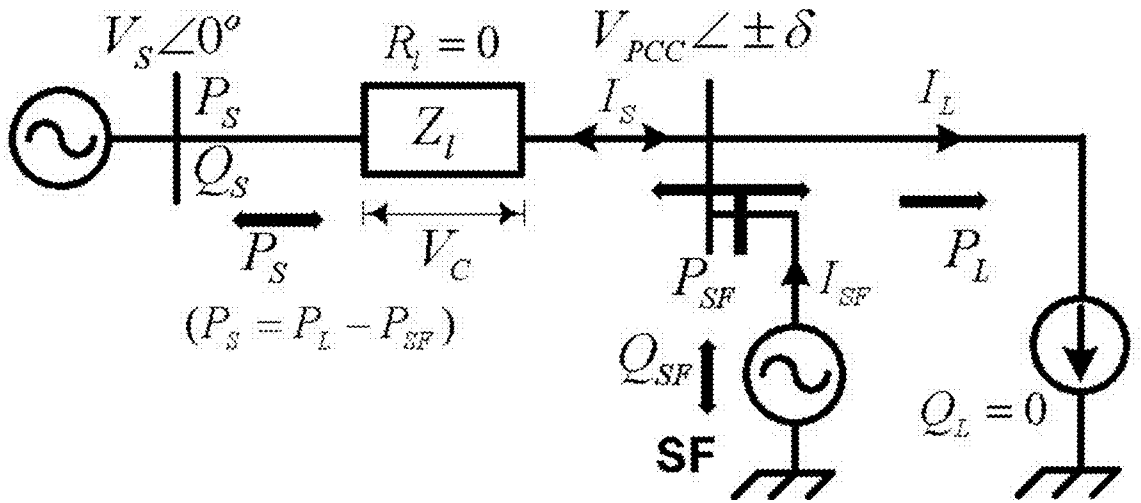
FIG. 3 shows a simplified system configuration of an embodiment of the present invention.

The system under consideration as given in FIG. 1 is represented in FIG. 3 as a simplified diagram to aid in a better understanding of the operating principle of the present invention. Furthermore, for simplicity, the following assumptions are made:

- line resistance and capacitance are neglected;
- load is connected very close to the solar farm, i.e. zero impedance between the PV solar farm and the load; and
- a unity power factor load.

The second assumption of connecting the load very close to the PV solar farm helps to simplify the phasor diagram as the load and the PCC voltages will be identical. However, for the more complex representation, the line impedance between the PCC and the load should be included. Under such a condition, the load voltage phasor will have lower/higher magnitude and a phase shift compared to the PCC voltage that would depend on the length of line $Z_{l2}$ and the amount of current drawn by the load.

In principle, when there is a drop or rise in voltage from its rated value, an externally installed FACTS device, such as a STATCOM, should inject appropriate reactive power to counterbalance the voltage drop/rise across the line impedance and thus restore the voltage close to the rated value.

When the PV solar farm (acting as STATCOM) injects reactive power (capacitive mode operation), the PCC voltage increases. However, if the PV solar farm acting as STATCOM absorbs reactive power (inductive mode operation) the PCC Voltage decreases. Hence a controlled reactive power injection/absorption in response to the measured value of the PCC voltage will regulate the PCC voltage and maintain it constant at a desired preset value.

Figure 4:
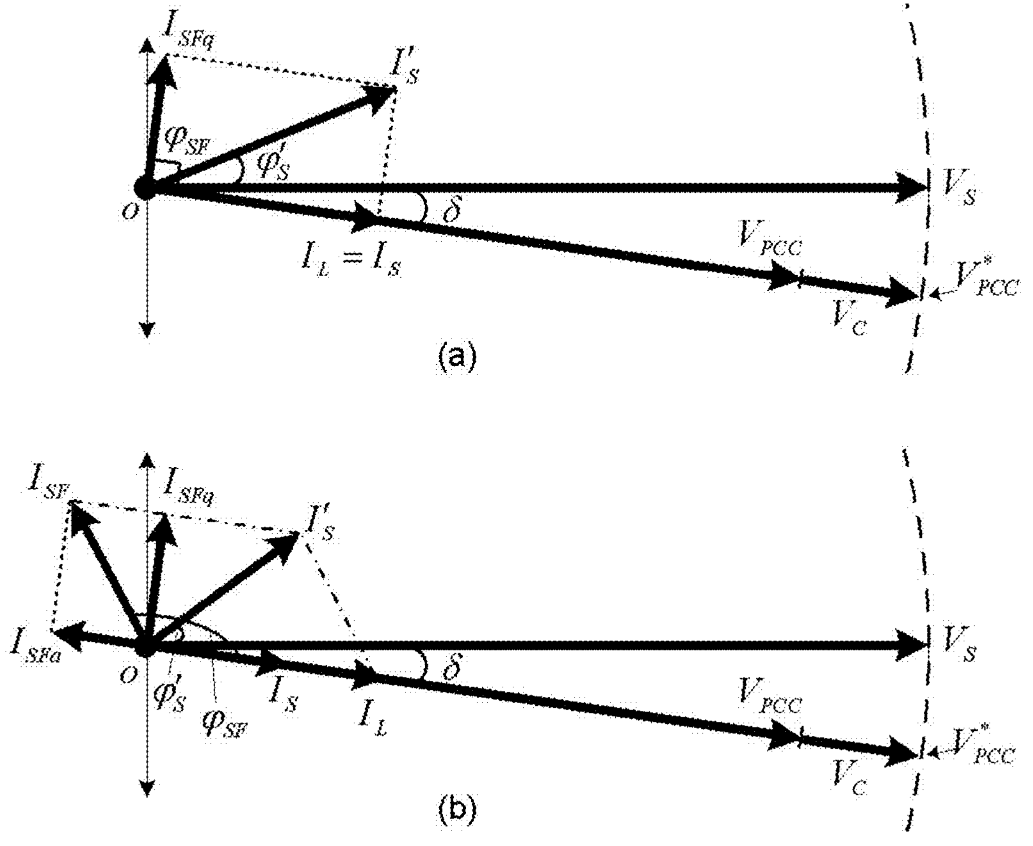
FIG. 4 shows a phasor representation of voltage drop compensation utilizing the PV solar farm inverter: (a) Nighttime operation and (b) Daytime operation.

FIG. 4 shows the phasor representation when the PV solar farm inverter is operated and controlled as a STATCOM to compensate for the drop in the voltage. The voltage at the distribution level (after the step-down transformer), $V_S$, is considered to be a reference phasor. The effective voltage drop that is responsible for regulating the PCC voltage is termed a compensating voltage ($V_C$). The flow of load current through the feeder causes the voltage to drop across the line impedances. For an uncompensated line, as the length of the line increases, the effective voltage available at the farthest end gradually drops. The line impedance is also responsible for the phase angle lag between the distribution transformer's secondary and PCC voltages, denoted as δ.

In order to compensate for the drop in voltage at the PCC, the solar farm is controlled as a capacitor. FIG. 4 (*a*) shows the phasor representation for the PV solar farm inverter compensating for the voltage drop during night-time. $V_{PCC}$ and $V^*_{PCC}$ represent the reduced and reference PCC voltages, respectively. Since the line resistance is neglected, the quadrature leading current ($I_{SFq}$), when flowing through the inductive line impedance, will cause an additive voltage drop $V_C$. This action will boost the reduced PCC voltage $V_{PCC}$ to $V^*_{PCC}$. The resultant source current ($I'_S$) is the vector sum of $I_L$ and $I_{SFq}$. The effective phase angle between the transformer secondary voltage $V_S$ and the resultant source current $I'_S$ is denoted as $\varphi'_S$. The phase angle between the voltage across the solar farm (PCC) and its injected current is denoted as $\varphi_{SF}$. During night-time, phase angle $\varphi_{SF}$ will be close to 90°.

The compensating voltage $V_C$ is a function of the line impedance ($Z_l$) and the quadrature current $I_{SFq}$, which can be expressed mathematically as:

$$|V_C| = I_{SFq} \cdot Z_l \tag{1}$$

From FIG. 4 (*a*), $V_C$ can also be represented as:

$$|V_C| = |V^*_{PCC}| - |V_{PCC}| \tag{2}$$

In equation (2), $V^*_{PCC}$ is a known quantity and, $V_{PCC}$ (actual PCC voltage) can be measured easily using a voltage sensor. Thus, the amount of the PV solar farm inverter current needed to compensate for the desired drop in voltage can be calculated as:

$$I_{SFq} = \frac{|V^*_{PCC}| - |V_{PCC}|}{Z_l} \tag{3}$$

FIG. 4 (*b*) shows the phasor representation of voltage drop compensation during daytime. The compensation principle and all the equations are identical to those for night-time operation. The only difference is that the solar farm inverter provides the reactive power (quadrature current) necessary to achieve the desired voltage boost while delivering the PV generated active power to the grid. Therefore, during daytime, the net current injected by the solar farm inverter ($I_{SF}$) will be the vector sum of the active ($I_{SFa}$) and the reactive ($I_{SFq}$) current components.

In a preferred embodiment of the invention, the increase in voltage can be due to the reverse power flow from another DG source on the same feeder or on a neighbouring feeder or from the solar farm itself (possibly during daytime).

It is known that real (active) power injection from solar farms causes voltage to rise in power distribution networks. This voltage rise can often exceed the utility acceptable limits, or the limits specified by applicable standards. Such an issue of voltage rise results in limiting the hosting capacity of distribution networks. Hosting capacity is described as "the amount of PV that can be accommodated without impacting power quality or reliability under existing control and infrastructure configurations" (see [5]). This description, although provided for PV systems, is also applicable for other types of Distributed Energy Resources (DERs) such as wind power systems, energy storage systems, electric vehicle charging systems, etc. Hosting capacity limits the amount of DERs that can be connected on any given distribution feeder without incurring any expensive upgrades such as construction of lines with higher capacity and/or higher rated transformers. It is noted that PV solar farm is a member of the family of Distributed Energy Resources (DERs)

The solar farm can operate as a STATCOM and provide voltage control to regulate its PCC voltage to within utility acceptable limits or the limits specified by applicable Standards. For this purpose of voltage control, the solar farm utilizes the inverter capacity remaining after generation of real power. This voltage control by the solar farm helps increase the hosting capacity of solar farms in power distribution systems.

In the nighttime, the entire solar farm inverter capacity is available for providing controllable reactive power for voltage regulation.

During the daytime, the inverter capacity remaining after real power injection is utilized for providing controllable reactive power for voltage regulation. For instance, it is only around noon time that the total inverter capacity is utilized for real power production. During morning hours and later afternoon hours, only a partial inverter capacity is used up.

Figure 5:
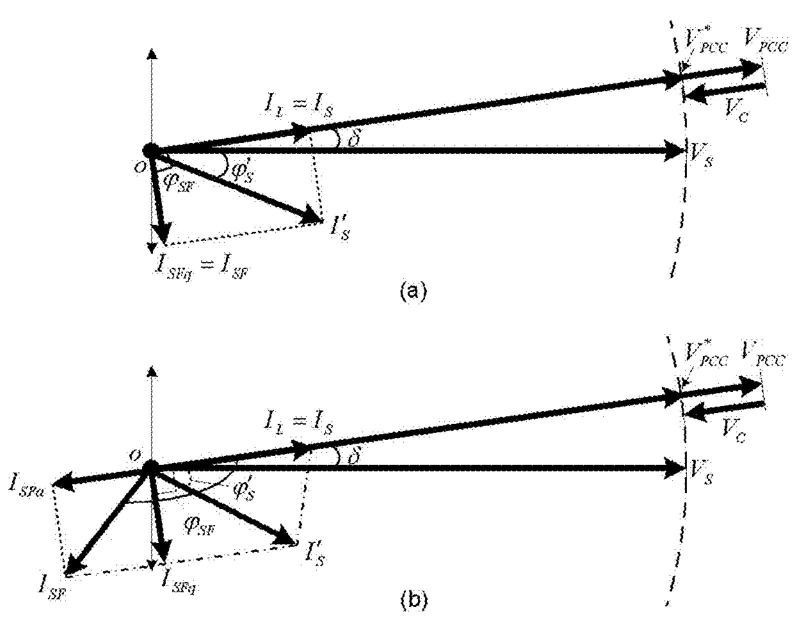
FIG. 5 shows a phasor representation of voltage rise compensation utilizing the PV solar farm inverter: (a) Nighttime operation and (b) Daytime operation.

FIG. 5 (*a*) shows the phasor representation of a PV solar farm inverter compensating for the voltage rise during night-time. In order to compensate the increased voltage at PCC, the solar farm is controlled as an inductor. The lagging current supplied by the solar farm inverter ($I_{SFq}$) will cause a subtractive voltage drop $V_C$ across the line inductance. The result of this will bring back the excess over voltage within the acceptable voltage limit. In FIG. 5 (*b*) the voltage rise compensation during daytime is shown. Here, the solar farm inverter injects active and reactive current components simultaneously to achieve overvoltage compensation while injecting active power to the grid. Equations (1) to (3) are also applicable for voltage rise compensation.

It is important to note that the above formulation is based on the assumption of an inductive line ($R_l$=0). For a more precise representation and calculation, the line resistance should also be considered. With a combined inductive and resistive line, when the solar farm inverter is utilized for voltage regulation, the drop across the resistive element will increase or decrease the phase angle shift between the resultant PCC and distribution transformer secondary voltages.

Thus, in a preferred embodiment, the solar farm inverter is operated (both during night-time and daytime) as a FACTS Device—STATCOM to regulate the feeder voltage and to support the expansion of the capacity of a distribution network. The increased capacity enables the addition of distributed power sources that would otherwise cause the line voltage to exceed rated limits at night. In a preferred embodiment, the additional distributed power sources include one or more wind farms connected on the same feeder.

In a preferred embodiment of the invention, the solar farm inverter is controlled to perform several other tasks. All these features are represented by block diagrams to depict the role of PV solar farm in supporting/injecting the reactive and active powers.

Figure 6:
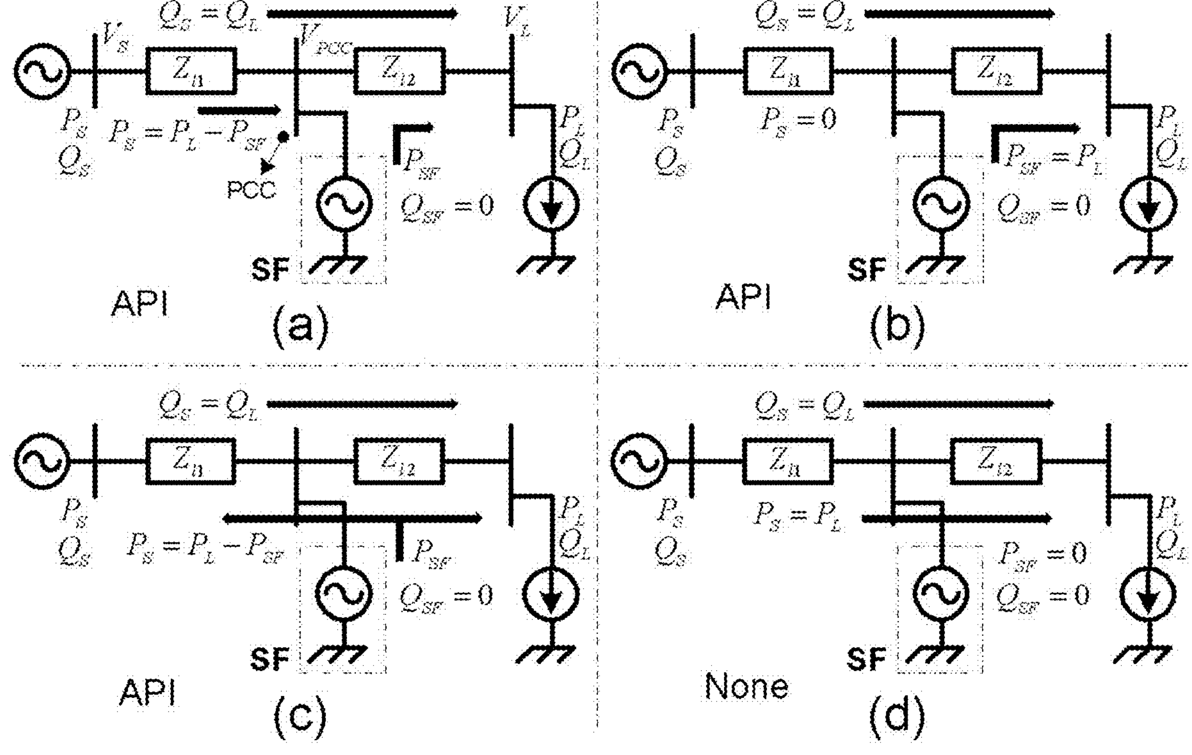
FIG. 6 shows the present utilization of a PV solar farm over 24 hours—(a) Day-time operation: PSF<PL, (b) Daytime operation: PSF=PL, (c) Day-time operation: PSF>PL, and (d) Night-time operation: PSF=0.

FIG. 6 shows the block diagram representation of a current utilization of a PV solar farm over a period of 24 hours. The load is assumed to be a combination of active and reactive power loads and the DG system is represented only by the solar farm. For better understanding, the flow of powers (active & reactive) at different locations is also highlighted in block diagrams.

FIGS. 6 (*a*)-(*c*) represent a typical day-time operation of a PV solar farm. Under these conditions, the solar farm injects active power generated by PV cells and this is termed as the 'active power injection (API)' mode of operation. Three possibilities for power generation from the solar farm are: (i) power generated by the solar farm ($P_{SF}$) is less than the load active demand ($P_L$) [FIG. 6 (*a*)], (ii) $P_{SF}$ is exactly equal to $P_L$ [FIG. 6 (*b*)], and (iii) $P_{SF}$ is greater than $P_L$ [FIG. 6 (*c*)]. The condition in FIG. 6 (*c*) represents the reverse power flow.

FIG. 6 (*d*) shows the block diagram representation of the solar farm during night-time. Note that the solar farm is inactive during the entire night-time period. In all of the above-mentioned operating scenarios, the reactive power demanded by the load is supplied by the grid.

Figure 7:
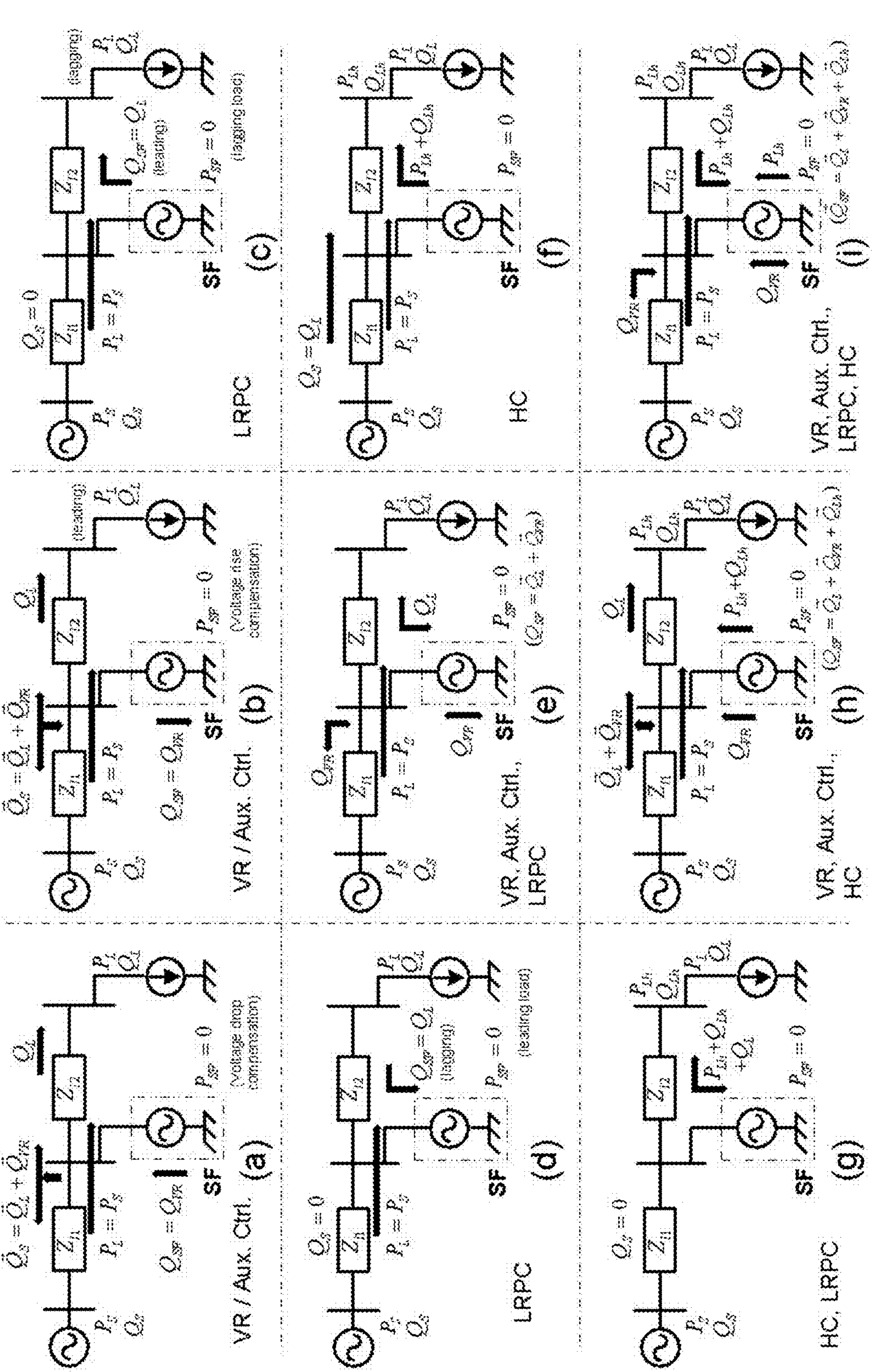
FIG. 7 shows different modes of operation of a PV solar farm during night-time according to an embodiment of the present invention.

The control aspects of the preferred embodiment of the invention are summarized in FIG. 7 and are briefly addressed hereafter. FIG. 7(*a*) depicts the previously discussed invention of the PV solar farm inverter as a STATCOM to regulate the PCC voltage. This mode of operation is referred to as 'voltage regulation (VR)'. The reactive power flow $Q_S$ during the voltage regulation mode of operation, seen from the distribution transformer side, will be the vector sum of $Q_L$ (if any) and $Q_{VR}$.

Furthermore, in a preferred embodiment of the invention, the PV solar farm inverter is controlled to damp any power oscillations caused by electromechanical oscillations (0.8-2 Hz) of synchronous generators in the grid as well as by any inter-area oscillations (0.1-0.8 Hz) that may get excited after any disturbance in the power system (see [3]). It should be noted that these disturbances might come from line/transformer switching or faults. The solar farm inverter can also be operated to improve the stability limit of the power system thus enabling higher power flows in the transmission lines in a secure manner. All these control aspects are accomplished through the auxiliary controller, referred to hereafter as the Aux. Ctrl.

According to the present invention, the auxiliary controller can be based on either locally measured signals known as "local" signals, or remotely transmitted signals known as "remote" signals. A property of these auxiliary signals is that they contain/reflect the power system oscillations which need to be damped by the solar farm inverter acting as a STATCOM. Examples of "local signals" are the line active power flow, the magnitude of line current, the local bus frequency, etc. On the other hand, examples of remote signals include remote bus voltages, oscillations of remote generators, and remote line flows, etc. These remote signals are made available to the Solar Farm acting as a STATCOM through Phasor Measurement Units (PMU) based on GPS technology or are transmitted through dedicated fibre optic cables.

The auxiliary controller may utilize a washout filter, a gain element, and a few stages of lead-lag controllers. The output of the auxiliary controller adds to the voltage controller. While the voltage control mode attempts to keep the PCC voltage constant with a very small time constant (15-45 msec), the auxiliary damping control allows a small modulation of the PCC voltage around the nominal values (with a slow time constant (0.1-2 sec)). This imparts a damping capability to the system when oscillations exist on the network. In absence of oscillations, only the voltage controller is active.

According to the present invention, if the load on the network demands lagging or leading reactive power, the PV solar farm inverter is controlled to support a leading (capacitive) or a lagging (inductive) reactive power. FIGS. 7 (*a*) and (*b*) show the flow of reactive power for a lagging power factor and for a leading power factor load condition, respectively. This "load reactive power compensation" (LRPC) mode of operation can thus ensure a unity power factor operation at PCC and can also help to reduce the line losses by an appreciable extent.

The difference between voltage regulation and load reactive power compensation modes of operation is explained here. When the solar farm inverter is used to support lagging or leading load reactive power demand, the voltage at PCC is indirectly raised or lowered, respectively, by a certain percentage. This percentage wholly depends on the amount of reactive power (lagging or leading) required by the load. However, there is no direct control over such voltage regulation. On the other hand, during the voltage regulation mode of operation, improvement in the power factor can also be accomplished. The two issues of voltage control and load power factor correction can be optimally controlled by integrating these aspects as depicted in FIG. 7 (*e*).

In a preferred embodiment of the invention, the PV solar farm inverter is also utilized to compensate/neutralize the harmonics generated by a non-linear load and thus can help to reduce the harmonics pollution on the distribution network. This control feature is referred to as 'harmonic compensation (HC)' mode of operation. FIG. 7(*f*) depicts the injection of harmonic active and harmonic reactive powers by the PV solar farm inverter to compensate for the harmonics generated by the non-linear loads connected downstream of the solar farm.

In the preceding discussion of the embodiments of the invention, the possible control approaches for the solar farm inverter to achieve individual functions at the distribution level have been presented. However, on a typical distribution network, a combination of these functions may need to be accomplished. In another preferred embodiment of the invention, the above discussed functions are coordinated simultaneously.

These coordinated features are depicted in FIGS. 7 (*g*), (*h*) and (*i*) for the combined VR/Aux. Ctrl. and HC; LRPC and HC; and VR/Aux. Ctrl. and LRPC and HC compensations, respectively. For a 3-phase 4-wire system, the solar farm inverter can also be utilized to compensate unbalanced load currents drawn by the combination of three-phase and single-phase loads. The block diagram representation for this feature is not shown in the FIG. 7.

In another preferred embodiment of the invention, the PV solar farm inverter is operated as a fully controlled battery charger especially during the night-time. In this case, the PV solar farm inverter in a combined solar farm and wind farm DG system is utilized in conjunction with energy storage batteries to store the excessive power generated by the wind farm. This feature performs two functions: (i) improving the system reliability by releasing the stored battery charge during peak load condition and, (ii) the real power storage during the charging process helps to regulate the rise in feeder voltage if controlled in an appropriate manner.

The solar farm inverter during the daytime should necessarily inject active power generated by the PV solar cells. While injecting the active power to the grid, the solar farm inverter can be additionally controlled to achieve the features discussed earlier in this document. However, the available solar farm inverter rating may impose a limitation on the amount of reactive power that can be injected during the daytime.

Figure 8:
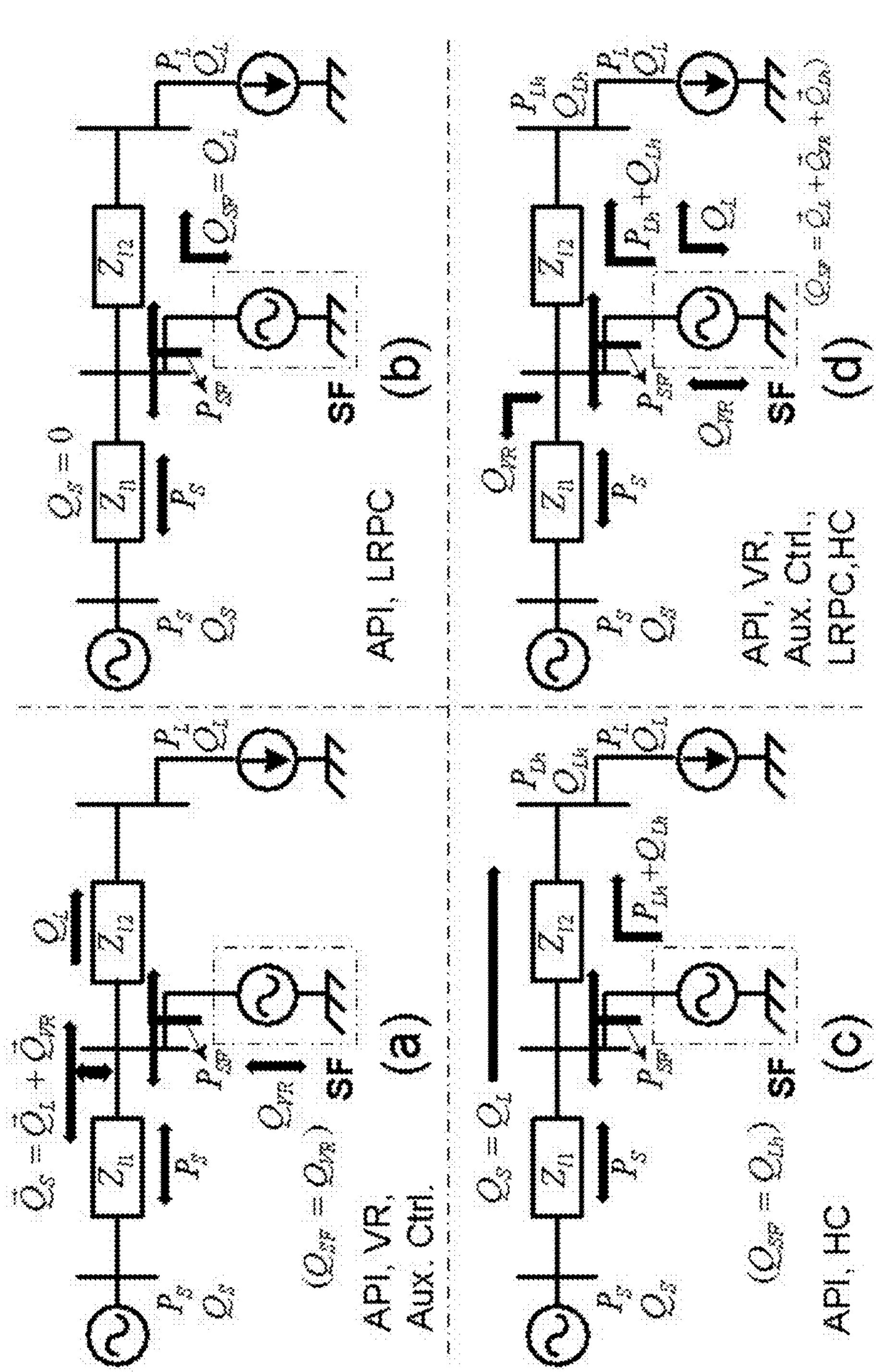
FIG. 8 shows additional modes of operation of a PV solar farm during night-time.

For a comprehensive overview, four block diagram representations of a proposed day-time operation are shown in FIG. 8. The block diagram representation for combined API & VR/Aux. Ctrl., API & LRPC and API & HC compensations are shown in FIGS. 8 (*a*), (*b*) and (*c*), respectively. FIG. 8 (*d*) shows the condition in which all of the features of API, VR/Aux. Ctrl., LPRC and HC are included. Similar to night-time operation, for a 3-phase 4-wire distribution system, the current unbalance compensation feature is achievable during the daytime too.

The preceding embodiments disclose several control aspects of the invention. The successful realization of the disclosed control aspects depends mostly on the amount of reactive power injected by the PV solar farm inverter (except for load balancing in which certain amount of active power is exchanged between load, inverter and grid). During the night-time mode of operation, a small amount of active power is drawn by the solar farm inverter to operate in self-supporting mode. The maximum reactive power that can be supported by a PV solar farm inverter is dependent on the MVA rating of that inverter. In the following section, the possibilities of reactive power support by a PV solar farm inverter are mathematically represented.

During Night-Time:

$$\left.\begin{array}{l} P_{SF}=0,\text{ therefore, } Q_{SF}=Q_{SF\,max}=S_{SF,rated} \\ I_{SF}=I_{SFq} \\ \varphi_{SF}=90^{\circ} \end{array}\right\} \tag{4}$$

During Daytime:

For rated power generation (100%)

$$\left.\begin{array}{l} P_{SF}=P_{SF\,max}=S_{SF,rated},\text{ therefore, } Q_{SF}=0 \\ I_{SF}=I_{SFa} \\ \varphi_{SF}=0^{\circ} \end{array}\right\} \tag{5}$$

For power generation less than the rated value (<100%)

$$\left.\begin{array}{l} S_{SF,rated}=P_{SF}+jQ_{SF} \\ I_{SF}=\vec{I}_{SFa}+\vec{I}_{SFq}, \\ \varphi_{SF}\neq 90^{\circ}\neq 0^{\circ} \end{array}\right\} \tag{6}$$

From (5), when the power generation from PV solar farm is at its rated value during daytime, the solar farm inverter cannot be used to provide the reactive power. For lesser active power generation, there is always an opportunity to provide simultaneous active and reactive power.

Figure 9:
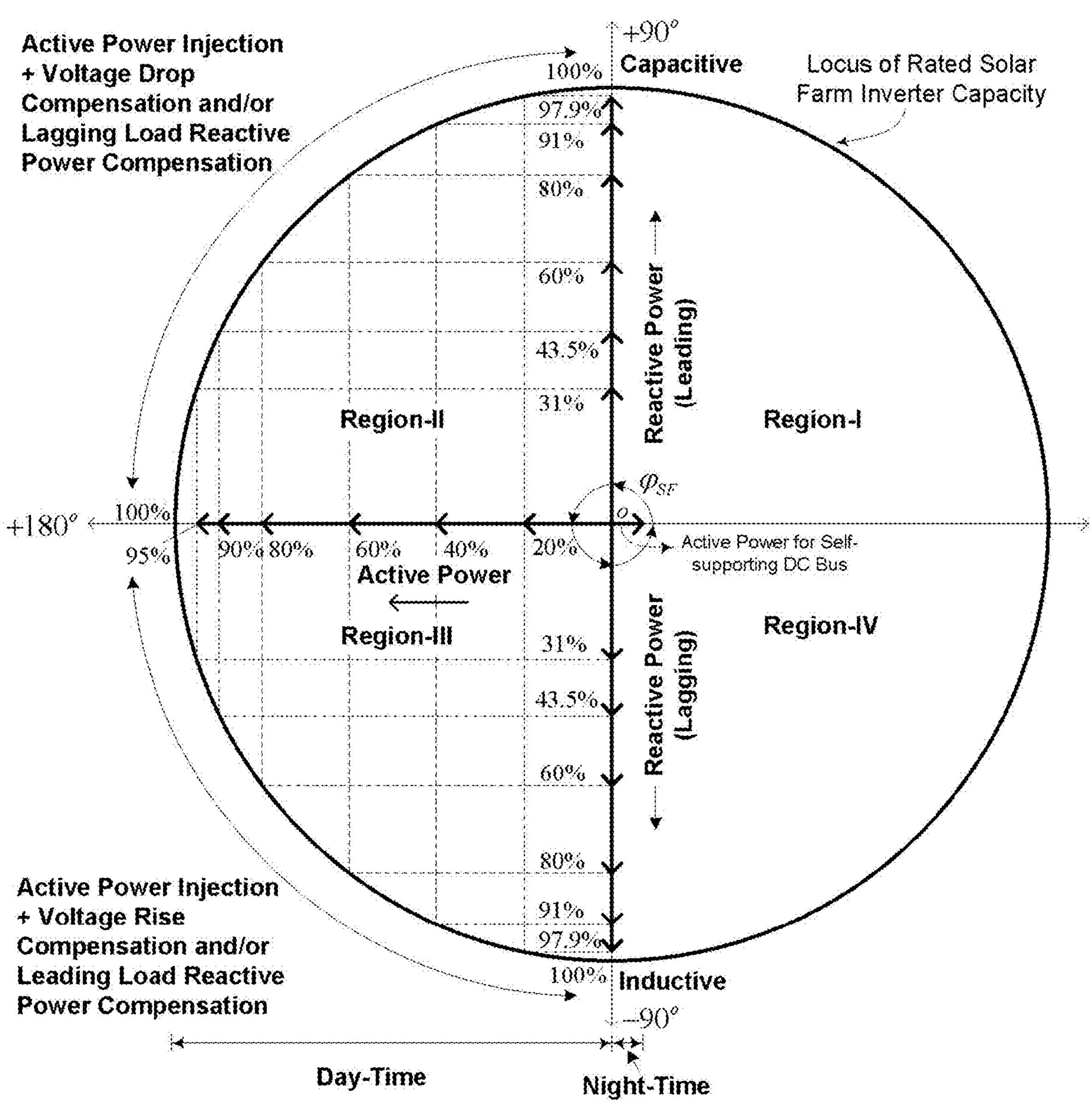
FIG. 9 shows a PV solar farm inverter active-reactive powers (P-Q) capability curve.

FIG. 9 shows an active-reactive powers (P-Q) capability curve drawn on the basis of rated PV solar farm inverter capacity. The x-axis represents the possible values of active powers, and the y-axis represents the possible values of reactive powers that the PV solar farm can support without an increase in available inverter rating. The P-Q diagram is divided in four regions based on the phase angle ($\varphi_{SF}$) of net injected current $I_{SF}$ $\varphi_{SF}$ is measured with respect to the PCC voltage), namely, Region-I, II, III and IV.

Ideally, the PV solar farm inverter should not consume any active power—there is therefore no activity in Region-I and Region-IV. However, using the present invention, especially during night-time, the PV solar farm will draw a very small amount of active power to maintain the voltage across the DC side capacitor. This active power is essential to overcome the losses associated with the inverter. When the PV solar farm does not produce any active power, the available reactive power capacity is 100%. As can be seen from FIG. 9, when the PV solar farm generates only 20% of rated power (early morning/evening hours), up to 97.9% reactive power is available for different compensations. Interestingly, 95% power generation still provides 31% of reactive power capacity that can be gainfully utilized.

In another preferred embodiment of the invention, an improved solar farm inverter is provided to support reactive power while injecting maximum rated power. To achieve reactive support while injecting maximum rated power, the solar farm inverter is provided with an increased power (MVA) rating. In a preferred embodiment, even a moderate over-sizing of the solar farm inverter provides significant benefits. In one example, if a solar farm inverter is over-sized by 5% to 10%, the available reactive power capacity left to perform other tasks would be 32% to 45.8% using 100% active power injection capacity.

The significant benefits provided by the above embodiment can be understood in an example in which a utility company needs to install a STATCOM to regulate the PCC voltage. In this case, if utility wants to provide 100% reactive power capacity, the required STATCOM rating would also be 100%.

From the above, one preferred embodiment of the invention, shows that simply over-rating the PV solar farm by 41.2% would provide the same capability as a separately installed 100% capacity STATCOM. Furthermore, one additional benefit with this over-sized (141%) inverter is that, during night-time when there is no active power generation, the reactive power capacity of inverter also would increase from 100% to 141%.

The STATCOM is rated based on its apparent power rating which is directly dependent on its semiconductor switches' voltage and current rating. The general manner of expressing the rating/capacity of electrical power related to electrical devices is by defining its MVA (Mega volt ampere; M for Mega, V for voltage, A for current in ampere).

Figure 10:
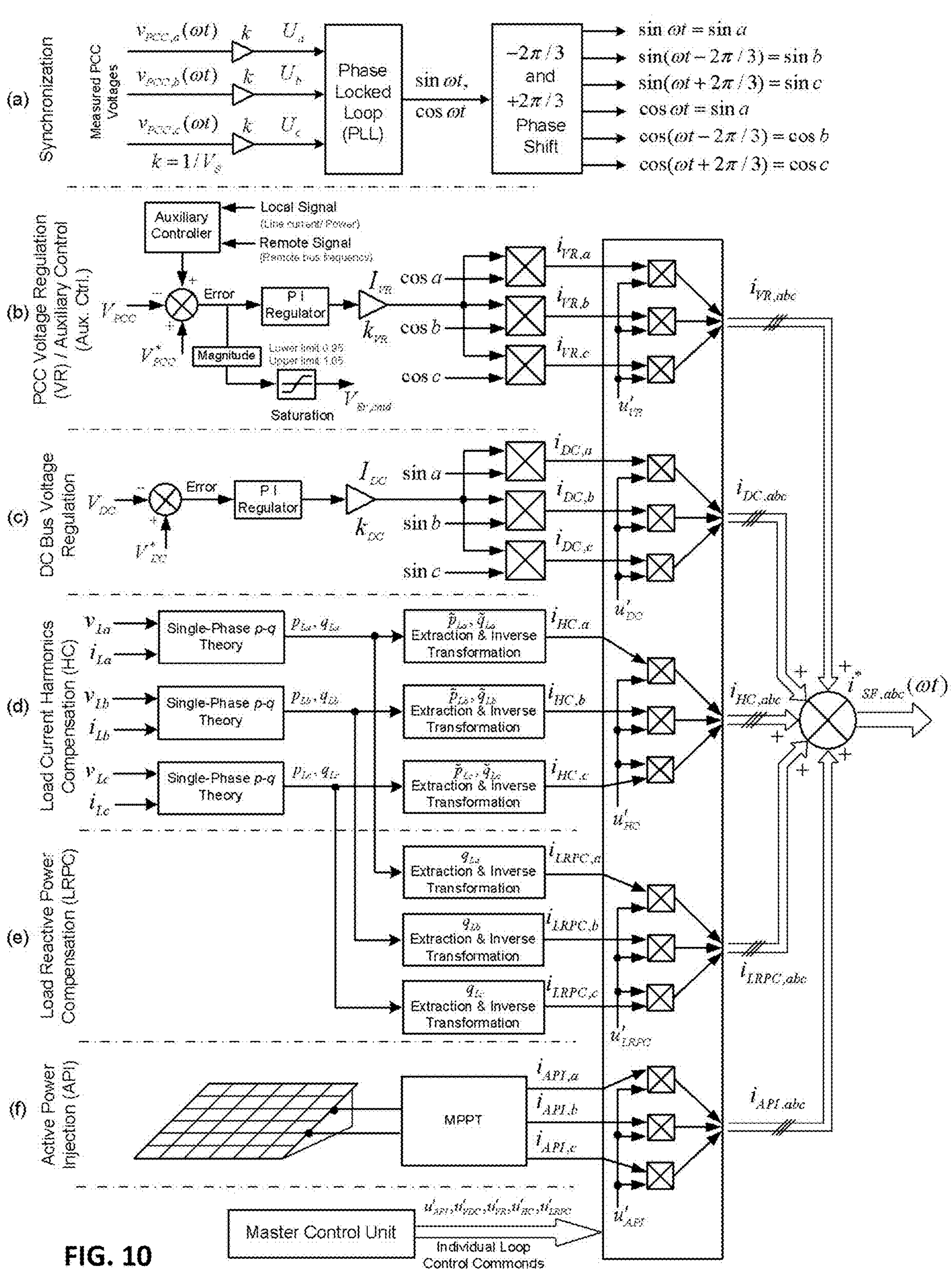
FIG. 10 shows a block diagram representation of control scheme used to implement an embodiment of the present invention.

FIG. 10 shows an exemplary block diagram representation of the control scheme used to achieve the preferred control concepts in which the solar farm is adapted to perform as a STATCOM and/or shunt active power filter. The exemplary control scheme is applicable both during the night and day times. The controller has six different loops, namely (a) synchronization, (b) PCC voltage regulation and damping control, (c) DC bus voltage regulation, (d) load current harmonic compensation, (e) load reactive power compensation and (f) active power injection.

A phase locked loop (PLL) is used to maintain synchronization with PCC voltage. The PLL gives output in terms of sine and cosine functions. The cosine functions are used to generate the reference quadrature components of currents to regulate PCC voltage. The sine functions are used to generate the in-phase reference current components. These components draw necessary fundamental active power to maintain the DC bus voltage at a predefined reference value. PCC and DC bus voltage control loops are composed of proportional-integral (PI) controllers.

In a preferred embodiment of the invention, an auxiliary controller is added in the PCC voltage regulation loop. This auxiliary controller can provide stabilization and damping controls for several proposed applications of the solar farm. Both the structure and operation of the auxiliary controller have already been described above.

To regulate the PCC voltage, the actual voltage at PCC is sensed and compared with a reference value $V^*_{pcc}$ of 1 pu. The output of the auxiliary controller is added to the voltage reference. The difference between the actual and reference voltages and auxiliary signal is then processed with the Proportional Integral (PI) regulator. The output of PI regulator is amplified with gain ($k_{VR}$) to generate the reference current magnitude ($I_{VR}$). The current magnitude $I_{VR}$ is then multiplied with cosine functions ('cos a', 'cos b' and 'cos c') to generate the reference quadrature components ($i_{VR,abc}$) which will regulate the PCC voltage. Similarly, the reference signals $i_{DC,abc}$ required to maintain the DC bus voltage constant are generated using sine functions, especially during night-time. The signal $V_{Er,cmd}$ in PCC voltage regulation loop is extracted for use in the master control unit. This activates/deactivates the voltage regulation loop.

Generally, in the real-time implementation, the control scheme is developed using a sophisticated digital controller (such as a microcontroller, digital signal processor [DSP], etc.). All the necessary quantities required in the control approach, (e.g. in our case, different voltages and currents) are sensed using voltage and current sensors (such as Hall-effect transducers). These sensors, regardless of whether they are used to determine voltage or current or any other parameter in real-time, provide an output which is a "scaled voltage signal". For example, to sense a 120 kV voltage, the sensor may have an output of 1 volt as a representative signal. The user has control over the setting of the sensor gain which can adjust the output value. A similar situation exists for current measurement in that the user has control over sensor gain and, as such, can adjust the output value. These scaled signals are then converted into digital signals by using an analog to digital converter. The user then multiplies the necessary gain in DSP to extract the exact value of the sensed signal. For example, a 1-volt signal can be multiplied by 120,000 to obtain the exact value of the sensed signal. These gains are constant values and do not need to change or be affected by any variation in the sensed signals. In the present invention, reference currents are being generated which will be injected through the PV solar farm inverter to achieve different control aspects. For ease of understanding, it should be noted that the signal corresponding to voltage is denoted as 'voltage' and the signal corresponding to current is denoted as 'current'. As mentioned above, all these signals in DSP are 'voltages'. Since the mathematical computations/operations in executed in DSP, the terms 'voltage'/'current'/'power' etc. do not have significant meaning as they are all representative signals.

DC bus voltage regulation mode is applied only during the night-time mode of operation to provide a self-supporting DC bus across the PV solar farm inverter. The DC bus capacitor is usually charged from the electrical output of the solar panels. During nighttime, since there is no solar power produced, this DC bus capacitor still needs to be kept charged to supply the reactive power expected by the STATCOM operation. The solar arrays should be isolated from the DC bus capacitor by disconnecting them through mechanical switches. This helps to ensure that the solar arrays will not be damaged due to sudden surges in voltage/current.

The DC bus voltage control loop is also comprised of a proportional-integral (PI) regulator. To regulate the DC voltage, the actual DC bus voltage is sensed and compared with an appropriately selected reference value $V^*_{dc}$. The difference between the actual and reference voltages is then processed with the PI regulator. The output of the PI regulator is amplified with a proper gain ($k_v$) to generate the reference current magnitude $I_{DC}$. The current magnitude $I_{DC}$ is then multiplied with sine functions ('sin a', 'sin b' and 'sin c') to generate the in-phase reference components ($i_{dc,abc}$). These components draw the necessary fundamental current component (active power) to maintain the DC bus voltage at the reference level. This active power is needed to overcome the losses associated with the inverter and passive elements (e.g. coupling inductance, DC bus capacitor, etc.) during STATCOM operation.

To provide the load reactive power and to compensate for current harmonics (if any), the instantaneous determination of different active and reactive powers is used—the active and reactive powers are computed using single phase p-q theory. This approach is used as it allows separate or combined load reactive and current harmonic compensations. Additionally, in case of unbalanced load condition, an easy expansion to include load balancing is possible. Using the concept of single-phase p-q theory, a three-phase system is represented as three separate single-phase systems and the single-phase p-q theory is applied to each phase independently.

Considering phase-a, the PCC voltage and the load current can be represented in α-β coordinates as:

$$\begin{bmatrix} v_{PCC,a\_\alpha} \\ v_{PCC,a\_\beta} \end{bmatrix} = \begin{bmatrix} v_{PCC,a}(\omega t) \\ v_{PCC,a}(\omega t + \pi/2) \end{bmatrix} \tag{7}$$

$$\begin{bmatrix} i_{L,a\_\alpha} \\ i_{L,a\_\beta} \end{bmatrix} = \begin{bmatrix} i_{L,a}(\omega t + \varphi_L) \\ i_{L,a}[(\omega t + \varphi_L) + \pi/2] \end{bmatrix} \tag{8}$$

Using the concept of single-phase p-q theory, the instantaneous active and reactive powers are determined as:

$$\begin{bmatrix} p_{La} \\ q_{La} \end{bmatrix} = \begin{bmatrix} v_{PCC,a\_\alpha} & v_{PCC,a\_\beta} \\ -v_{PCC,a\_\beta} & v_{PCC,a\_\alpha} \end{bmatrix} \cdot \begin{bmatrix} i_{L,a\_\alpha} \\ i_{L,a\_\beta} \end{bmatrix} \tag{9}$$

Total instantaneous active ($p_{La}$) and total instantaneous reactive power ($q_{La}$) can be decomposed into fundamental and harmonic powers as:

$$p_{La} = \overline{p}_{La} + \tilde{p}_{La} \tag{10}$$

$$q_{La} = \overline{q}_{La} + \tilde{q}_{La} \tag{11}$$

In (10) & (11), $\overline{p}_{La}$ and $\overline{q}_{La}$ represent the DC components, which are responsible for fundamental load active and reactive powers. $\tilde{p}_{La}$ and $\tilde{q}_{La}$ represent the AC components which are responsible for harmonic powers. The fundamental instantaneous load active ($\overline{p}_{La}$) component and the fundamental instantaneous load reactive ($\overline{q}_{La}$) component can be extracted easily from $p_{La}$, and $q_{La}$, respectively, by using a low pass filter (LPF). Furthermore, the instantaneous harmonics active ($\tilde{p}_{La}$) and reactive power ($\overline{q}_{La}$) components can be separated from the total power by using a high pass filter (HPF). Thus, using the concept of single-phase p-q theory, different active and reactive powers can be calculated separately in real-time.

For load current harmonic compensation, the solar farm inverter should supply the harmonic part of the load current. That is, the reference current signal generation should be based on terms $\tilde{p}_{La}$ and $\tilde{q}_{La}$.

Therefore for phase-a, $$\begin{bmatrix} i_{HC\_\alpha} \\ i_{HC\_\beta} \end{bmatrix} = \frac{1}{A_{xa}} \cdot \begin{bmatrix} v_{PCC,a\_\alpha} & v_{PCC,a\_\beta} \\ v_{PCC,a\_\beta} & -v_{PCC,a\_\alpha} \end{bmatrix} \cdot \begin{bmatrix} \tilde{p}_{La} \\ \tilde{q}_{La} \end{bmatrix} \tag{12}$$

$$\text{where, } A_{xa} = v^2_{PCC,a\_\alpha} + v^2_{PCC,a\_\beta} \tag{13}$$

Since α-axis quantities represent the original system, the reference current for load current harmonic compensation can be given as:

$$i_{HC,a}(\omega t) = \frac{1}{A_{xa}} \cdot \left[ v_{PCC,a\_\alpha}(\omega t) \cdot \tilde{p}_{L,a}(\omega t) + v_{PCC,a\_\beta}(\omega t) \cdot \tilde{q}_{L,a}(\omega t) \right] \tag{14}$$

Similarly, the reference current for load current harmonic compensation for phase-b and phase-c are also estimated.

For fundamental load reactive power compensation, the reference current should be based on only the term $\overline{q}_{La}$.

Therefore for phase-a, $$\begin{bmatrix} i_{LRPC\_\alpha} \\ i_{LRPC\_\beta} \end{bmatrix} = \frac{1}{A_{xa}} \cdot \begin{bmatrix} v_{PCC,a\_\alpha} & v_{PCC,a\_\beta} \\ v_{PCC,a\_\beta} & -v_{PCC,a\_\alpha} \end{bmatrix} \cdot \begin{bmatrix} 0 \\ \overline{q}_{La} \end{bmatrix} \tag{15}$$

The reference current for load reactive power compensation can be given as:

$$i_{LRPC,a}(\omega t) = \frac{1}{A_{xa}} \cdot \left[ v_{PCC,\beta}(\omega t) \cdot \overline{q}_{L,a}(\omega t) \right] \tag{16}$$

Similarly, the reference current for load reactive power compensation for phase-b and phase-c are also estimated.

The active power generated from the PV solar plant is transferred to the main grid through a proper controller, for example, in the maximum power point tracking (MPPT) mode. Finally, all the control loop current components are added together to generate the overall reference current signals ($i^*_{SF,abc}$) for the solar farm inverter. These reference signals are then compared with actual sensed solar farm inverter output currents ($i_{SF,abc}$) and processed using a hysteresis current controller to perform switching of inverter semiconductor devices.

Figure 11:
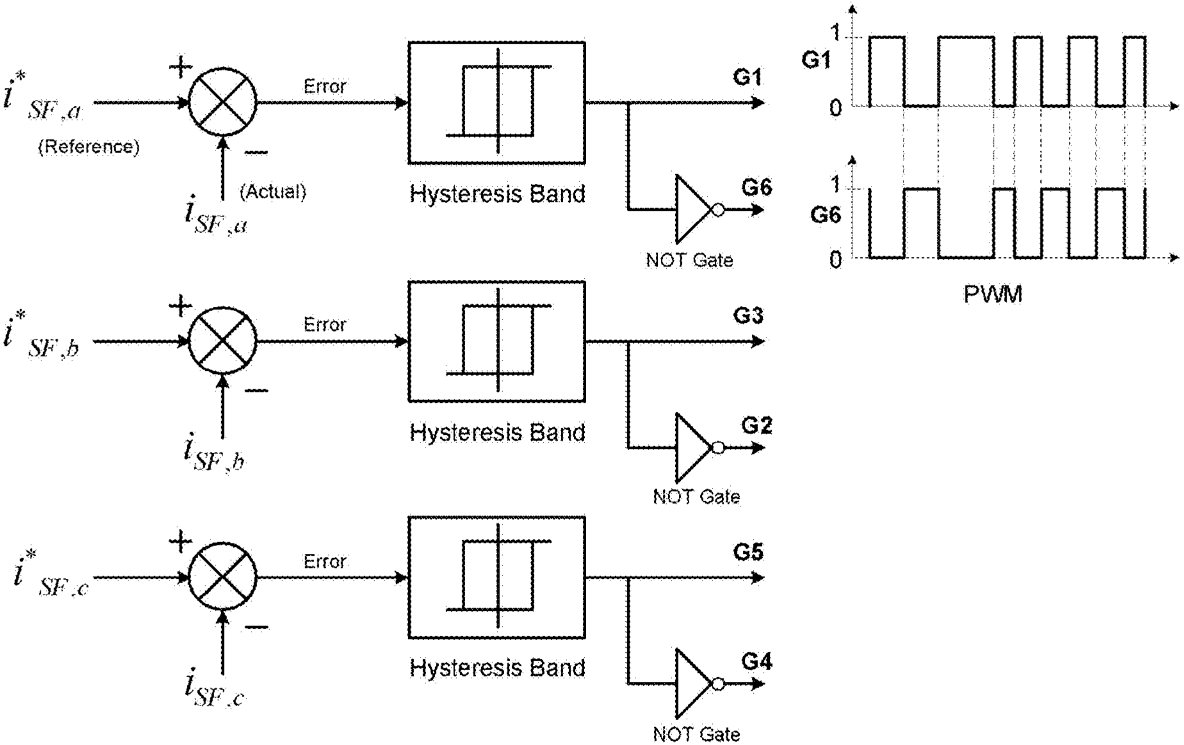
FIG. 11 shows a block diagram representation for hysteresis current control operation.

FIG. 11 depicts the block diagram of a Hysteresis current controller. A Hysteresis controller gives a switching instant (for example, G1) whenever the error exceeds a fixed magnitude limit i.e. a hysteresis band. In order to avoid a short circuit, an opposite signal is applied to switch S6. A "NOT" gate is used to generate the desired S6 pulse. By using three hysteresis controllers, one for each phase, the gating signal pattern (G1 to G6, see FIG. 2) for the PC solar farm inverter is generated.

All the reference signals for different functionalities are generated on a continuous basis and the master control unit is used to activate/deactivate different loops based on priorities and control requirements. For example, the voltage regulation mode is activated only if the PCC voltage rises/drops below the set reference value of ±1% (1.01 pu or 0.99 pu). The current harmonic compensation loop is activated if the THD in load current is noticed to be more than 5%.

Figure 12:
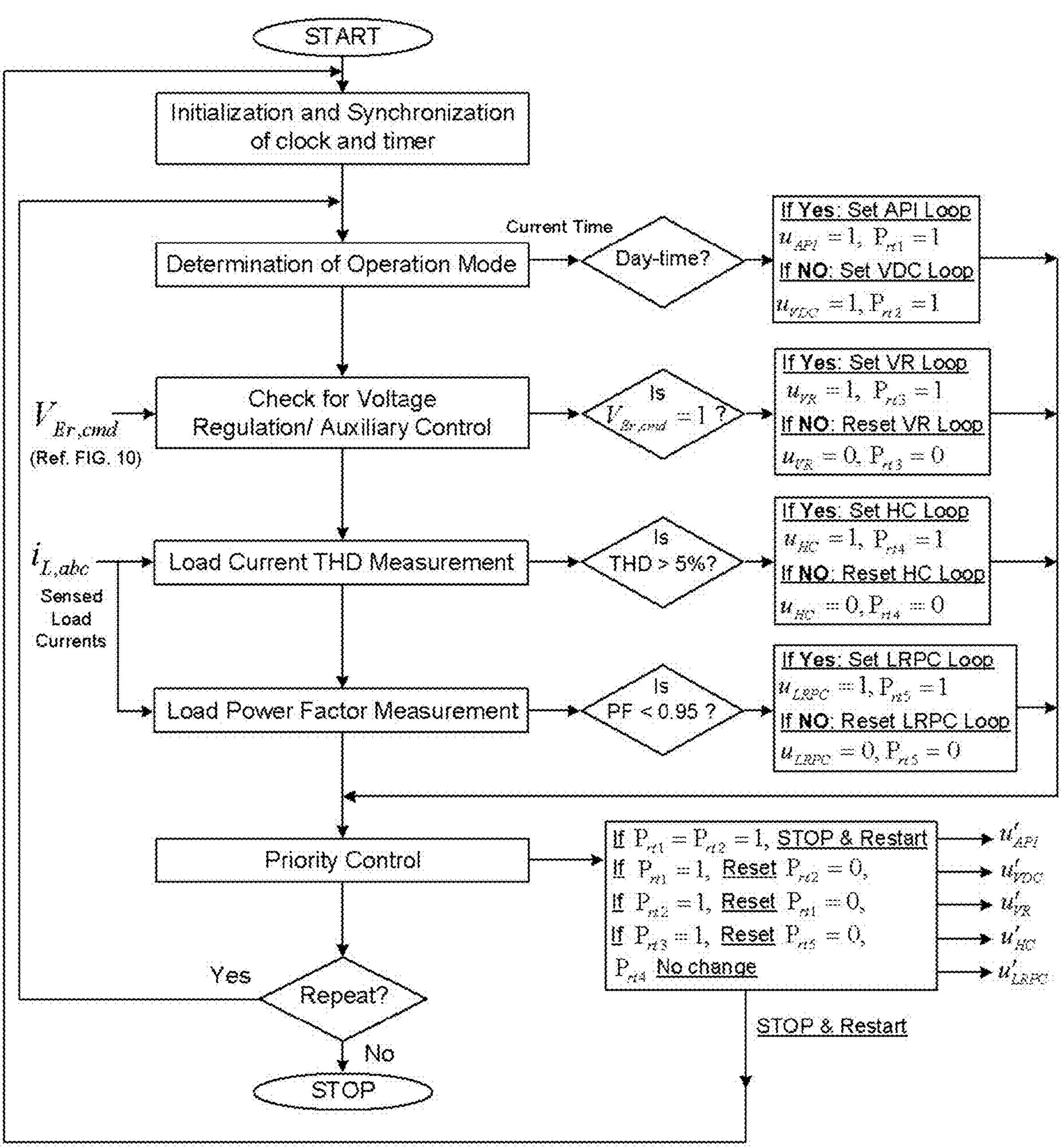
FIG. 12 shows a flow chart to activate particular mode of operation.

An exemplary flow chart for the master control unit is given in FIG. 12. A priority is assigned to each of the tasks. The primary use of solar farm inverter is for injecting the available PV solar power to the grid during the daytime. Therefore, the active power injection loop has been given the highest priority. Since it is important to have a self-supporting DC bus so as to achieve different tasks during night-time, this task has been given the second highest priority. It should be noted that care must be taken not to activate both the loops simultaneously. Similarly, other loops have been assigned hierarchical priorities. The master control unit generates five priority based control commands, namely, $$u'_{API}, u'_{VDC}, u'_{VR}, u'_{HC} \text{ and } u'_{LRPC}.$$

These control commands can have "0" or "1" value and are multiplied with respective control loop reference current components to active or deactivate it.

The inverter controller, shown schematically in FIG. 11, may be implemented using several different types of semiconductor device switches such as GTOs, IGBTs, IGCTs, etc. For example, those skilled in the art would readily appreciate that the present invention is equally applicable for single-phase and three-phase four wire systems. The present invention is also applicable to a three-phase three-wire system.

The present invention is typically more beneficial for a large-scale DG system. To regulate the feeder voltage when the system voltage is high (e.g. 12.7 kV, 27.6 kV, etc.), the PV solar farm capacity should be high enough (i.e. in the order of megawatts) to give satisfactory results. The present invention is equally applicable to smaller size DG systems with the caveat that such implementations would have reduced network compensation capability.

The present invention is also applicable for small capacity PV solar farms. However, as mentioned earlier, the compensation capability is dependent on the sum of individual PV solar farm inverter ratings. If there are many small PV solar farms in close vicinity, using a more complex control approach, all the small PV solar farms can be seen as one large unit. By dividing the control objective into parts, the same performance as that of using a single high rated PV solar farm can be achieved. For example, if a 1 MW solar farm can control the PCC voltage as a STATCOM by injecting 1 MVAR reactive power, then, 10 PV solar farms, each of 100 kW capacity (connected close to each other), can perform the same operation by supporting 100 kVAR reactive power from each of 10 PV solar farm inverter.

An inverter-based power generation source, e.g., solar farm, typically comprises several inverters. According to the present invention, the STATCOM functions may be performed by using an unutilized capacity (i.e., any inverter capacity remaining after active power generation) of at least one inverter within the inverter-based power generation source.

All the proposed embodiments and capabilities of the invention can be achieved for any type of distribution network, be it of radial type or meshed type.

While the preceding embodiment of the invention provided a system and method for adding additional wind farms to a DG network by adapting a solar farm inverter to operate as a STATCOM, the invention is not limited to wind farms as existing or additional DG systems. Any other inverter-based DG system that is inactive at any point of time (day or night) for any reason, can also be utilized as a STATCOM as described above. Such a DG system could be a large inverter-based wind farm or a Fuel Cell based DG. The present invention provides for the utilization of an inactive inverter which may come from any DG at any time.

An inverter based distributed power generation source may be of two types: i) without an energy storage system, and ii) with an energy storage system. Some examples of distributed power generation sources without energy storage are photovoltaic solar farms, wind farms, etc. Whereas some examples of distributed power generation sources with energy storage are battery energy storage systems, electric vehicle charging systems, flywheel energy storage systems, ultra-capacitor based storage systems, etc.

An inverter based distributed power generation source without any energy storage will typically only serve to inject (i.e., "export") active power into the power grid system. However, an inverter based distributed power generation source with energy storage exchanges active power with the power grid system. That is to say, an inverter based distributed power generation source with energy storage may both inject (i.e., "export") active power into the power grid system and absorb (i.e., "import") active power from the power grid system. Thus, in terms of the present invention, the terms "export" and "import", respectively, serve to indicate whether active power is injected into the power grid or absorbed from the power grid.

The term "power grid" in terms of the present disclosure is defined to include: i) "power transmission system", or ii) "power distribution system" or iii) "microgrid system" or iv) any combination of i), ii) and iii).

When an inverter based distributed power generation source without any energy storage system is not injecting any active power into the power grid system due to the lack of availability of a primary energy source, e.g., photovoltaic solar farms at night when the sun is not present, or wind farms during conditions of no wind, the inverter based distributed power generation source draws a small amount of active power to cover losses within the inverter(s) of the inverter based distributed power generation source. Similarly, when an inverter based distributed power generation source with an energy storage system is not exchanging (i.e., not injecting nor absorbing) any active power with the power grid system, the inverter based distributed power generation source will draw a small amount of active power to cover losses within the inverter(s) of the inverter based distributed power generation source.

The present invention enables an inverter based distributed power generation source with an energy storage system to be controlled as a STATCOM and provide all the STATCOM functions with the inherent benefits of a STATCOM when the energy storage based distributed power generation source is doing at least one of: i) not exchanging (i.e., neither injecting nor absorbing) active power with the power grid system, or ii) exchanging (i.e., affirmatively injecting or absorbing) active power less than a maximum inverter capacity with the power grid system. The present invention thus provides a technological improvement that opens up a new set of applications and potential revenue earning opportunities for energy storage based distributed power generation sources other than simply from exchanging (injecting or absorbing) active power.

It should be understood that the inverter-based power generation source with energy storage system typically comprises several inverters. According to the present invention, the STATCOM functions may be performed by using an unutilized capacity (i.e., any inverter capacity remaining after active power exchange) of at least one inverter within the energy system-based power generation source.

The present invention further allows combined operation of an inverter based distributed power generation source with an energy storage system and an inverter based distributed power generation source without any energy storage system, where either or both are controlled as a STATCOM and provide all the STATCOM functions with the inherent benefits of a STATCOM, when: a) the energy storage based distributed power generation source is performing at least one of: i) not exchanging (injecting or absorbing) active power with the power grid system, or ii) exchanging (injecting or absorbing) active power less than a maximum inverter capacity with the power grid system; and b) the non energy storage based distributed power generation source is performing at least one of: i) not providing active power to the power grid system, or ii) providing active power less than a maximum inverter capacity to the power grid system.

Thus, the present invention thus provides a technological improvement that opens up a new set of applications and potential revenue earning opportunities for both energy storage based, and non energy storage based, distributed power generation sources other than simply from exchanging (injecting or absorbing) active power.

It is important to note that the system shown in FIG. 10 is merely an example of the components required to achieve the operation of a solar farm as a STATCOM and shunt active power filter, and those skilled in the art will readily understand that the present invention further contemplates other related methods and systems. For example, the inverter may be switched with switching means other than a hysteresis current controller, such as other power semiconductor switching devices known in the art that include, but are not limited to, GTOs, IGBTs, IGCTs, etc.

Furthermore, while the processing elements shown in FIG. 11 are shown as discrete elements, they may be provided in a single device, such as a computer processor, an ASIC, an FPGA, or a DSP card.

In a further embodiment, the present invention provides a voltage control and a damping control with a grid connected inverter based solar DG, or an inverter-based wind DG, to improve the transient stability of the system whenever there is an availability of reactive power capacity in the DGs. This aspect of the present invention has been studied and performed for two variants of a Single Machine Infinite Bus (SMIB) system. One SMIB system uses only a single solar DG connected at the midpoint whereas the other system uses a solar DG and a converter-based wind DG. Three phase fault studies are conducted using the electromagnetic transient software EMTDC/PSCAD, and improvements in stable power transmission limit are investigated for different combinations of controllers on the solar and wind DGs, both during night and day.

Figure 13:
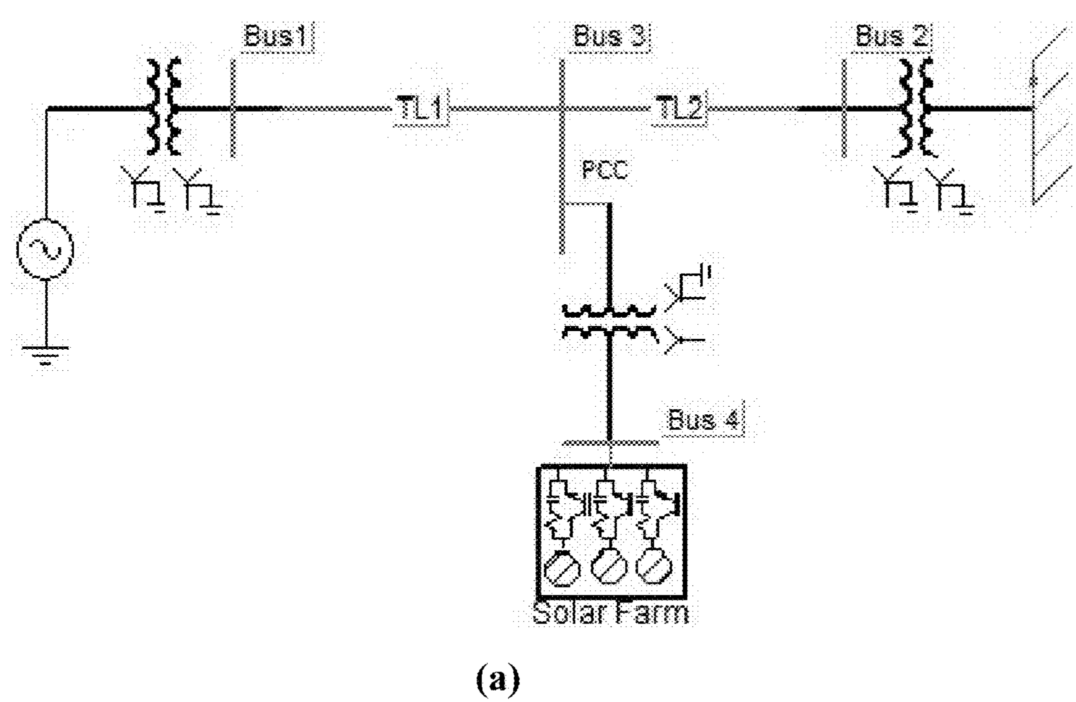
FIG. 13 shows a line diagram of (a) study system I with single solar farm and (b) study System II with a solar and a wind farm according to an embodiment of the present invention.
Figure 13:
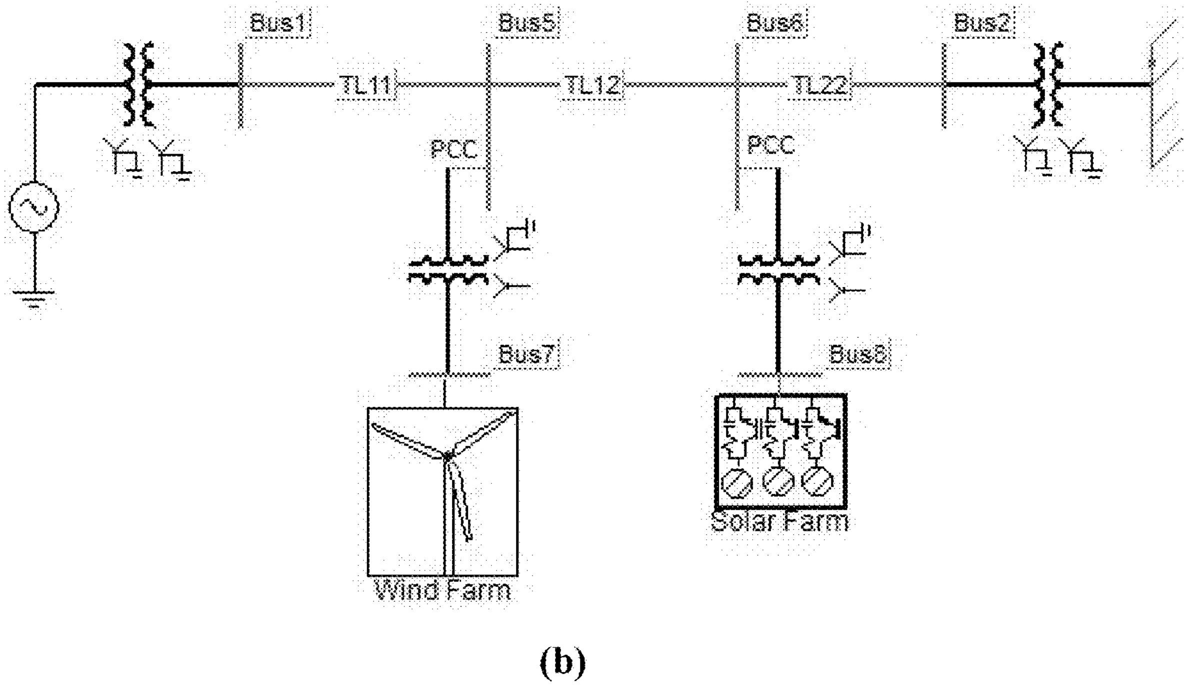

The single line diagrams of two study systems—Study System 1 and Study System 2 are depicted in FIG. 13 (*a*) and FIG. 13(*b*), respectively. Both systems are Single Machine Infinite Bus (SMIB) systems in which a large synchronous generator (1110 MVA) supplies power over a 200 km, 400 kV transmission line to the infinite bus.

Figure 14:
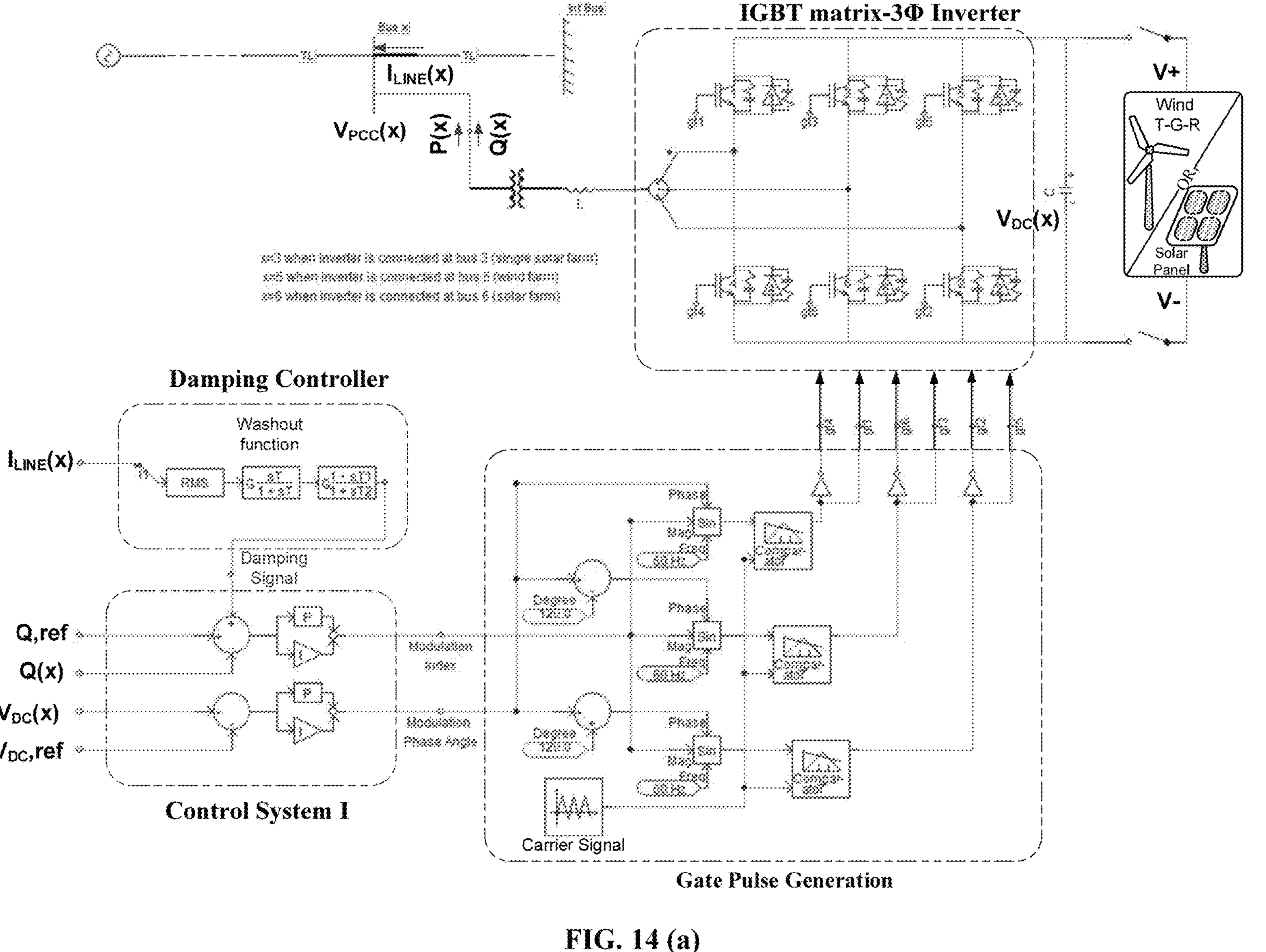
FIGS. 14(*a*), 14(*b*), and 14(*c*) each show block diagrams of the various subsystems in the two equivalent DGs in accordance with a further embodiment of the present invention.
Figure 14:
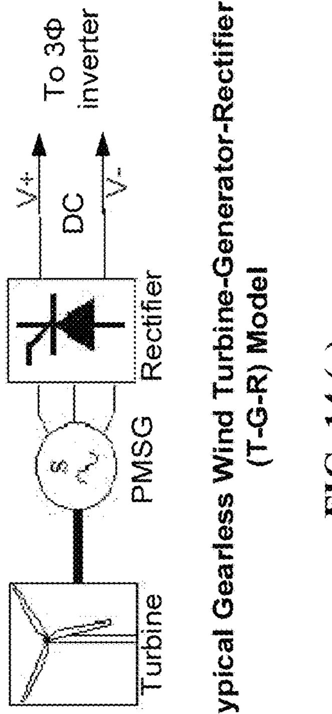
Figure 14:
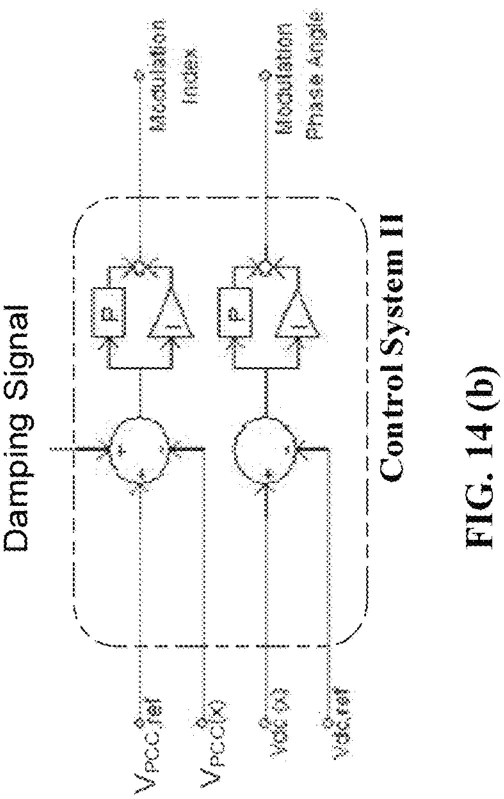

In Study System 1, a single inverter based Distributed Generator (a solar farm in this case) is connected at the midpoint of the transmission line. In Study System 2, two inverters based DGs are connected at ⅓rd and ⅔rd line length from the synchronous generator. The DG connected at ⅓rd distance is considered to be a wind farm utilizing Permanent Magnet Synchronous Generators (PMSG) with ac-dc-ac converters, whereas the DG connected at ⅔rd distance is considered to be a solar farm. It is understood that both the solar farm and wind farm will have several inverters in each of them. However, for this analysis, each DG is represented by a single equivalent inverter having a total rating of either the solar farm or wind farm. Both the wind farm and solar farm are considered to be of the same rating, and therefore can be interchanged in terms of location depending upon the studies being performed. FIGS. 14(*a*), 14(*b*), and 14(*c*) each illustrate the block diagrams of the various subsystems in the two equivalent DGs.

The synchronous generator is represented in detail by a sixth order model and a DC1A type exciter. The different transmission line segments TL1, TL2, TL11, TL12, TL22, shown in FIG. 13 are represented by corresponding lumped pi-circuits. Saturation is neglected in both the sending end and receiving end transformers.

The solar farm and wind farm, as depicted in FIG. 14(*a*), are each modeled as equivalent voltage sourced inverters along with pure DC sources. In the solar farm, the DC source is provided by the solar panels output, whereas in the wind farm, the PMSG wind turbines rectifier output generates the DC voltage source. The DC power output of each DG is fed to the DC bus of the corresponding inverter to inject real power to the grid, as illustrated in FIG. 14(*a*). The magnitude of real power injection from the DGs to the grid depends upon the magnitude of DC input voltage. The voltage source inverter in each DG is composed of six IGBTs in a matrix with snubber circuits as shown by 'IGBT matrix' block in FIG. 14(*a*). A large size DC capacitor is used to reduce the DC side ripple. Each phase has a pair of IGBT devices which convert DC voltage into a series of variable width pulsating voltages according to the switching signal to the matrix utilizing the sinusoidal pulse width modulation (SPWM) technique. Switching signals are generated from the amplitude comparison of variable magnitude sinusoidal signal known as 'modulating signal' with high frequency fixed-magnitude triangular signal known as 'carrier signal' as shown in the 'gate pulse generation' block in FIG. 14(*a*). The variable magnitude and the phase angle of sinusoidal modulating signals are controlled by either one of the external controllers—'control system I' block in FIG. 14(*a*) or 'control system II' block in FIG. 14(*b*), which modifies the switching signal width duration. The modulating signals used for three phases are equally spaced and thereby shifted by 120o whereas the same carrier wave is used for all three phases. Some filter equipment may be needed at the AC side to eliminate harmonics. In this model the carrier signal amplitude is normalized to unity, hence the magnitude of modulating signal is alternately designated as modulation index (MI).

In the PWM switching technique, the magnitude of voltages and the angle of voltages at the inverter output are directly dependent on the modulation index (MI) and on the modulation phase angle, respectively. To control the modulation index and the modulation phase angle, two separate PI control loops are simultaneously integrated with the inverter. The different DG control systems utilized are described below.

i) Control System 1: This contains two Proportional Integral (PI) controllers, as depicted in FIG. 14(*a*). The lower PI controller is used to maintain the voltage, VDC, across the DC link capacitor, whereas the upper PI controller, known as the reactive power controller, is utilized to directly control the flow of reactive power from the DG to the PCC through the control of the modulation index. The measured reactive power flow from the DG is therefore used as controller input and compared with Qref. Normally, the DGs are required to operate at almost unity power factor and therefore in the conventional reactive power control of the DGs, the Qref is set to zero.

ii) Control System II: This control system also comprises two PI controllers as shown in FIG. 14(*b*). The upper PI controller, known as voltage controller, is mainly used to regulate the PCC voltage to a predefined set point. This controller regulates the PCC voltage through the control of modulation index and thereby uses the PCC voltage as controller input. As the amount of reactive power flow from the DG inverter depends upon the difference in magnitudes of voltages at PCC and inverter terminal, the DG reactive power flow can also be controlled indirectly with this control system. In this control system also, the lower PI controller is used to maintain the voltage, VDC, across the DC link capacitor.

iii) Damping controller: A novel auxiliary 'damping controller' shown in FIG. 14(*a*) is utilized to damp the rotor mode (low frequency) oscillations of the synchronous generator and to thereby improve the system transient stability. This damping controller is appended to both Control System 1 and Control System 2. In this controller, the line current magnitude signal is utilized as the control signal which senses the rotor mode oscillations of the generator. The magnitude of line current signal is passed through a washout function in series with a first order lead lag compensator.

The damping controller can be used as a supplementary controller together with either the voltage controller or reactive power controller. The parameters of the reactive controller, the voltage controller and auxiliary controller are tuned by a systematic hit and trial method, in order to give the fastest step response, least settling time and a maximum overshoot of 5%.

Transmission lines are series compensated by installing capacitors in series with the lines to increase their power transmission capacity. Series compensation, however, makes synchronous generators connected to these lines prone to subsynchronous oscillations (see [3] and [4]). The subsynchronous oscillations have frequencies less than the nominal system frequency (60 Hz or 50 Hz). If these subsynchronous oscillations are not appropriately damped, they can cause subsynchronous resonance (SSR) resulting in enormously expensive generator shaft failures/breakages. Subsynchronous oscillations are also caused in HVDC systems connected to series compensated lines. According to [4] and [6], subsynchronous oscillations are also caused when wind farms are connected to series compensated lines. According to [4], the phenomenon leading to subsynchronous oscillations in wind farms, especially Doubly Fed Induction Generator (DFIG) based wind farms, is termed subsynchronous control interaction (SSCI).

A PV solar farm, connected in the same series compensated transmission network as synchronous generators, HVDC converters, or wind farms, can be operated as a STATCOM when it is performing at least one of: i) not providing active power to the power grid system (i.e., during nighttime), or ii) providing active power less than a maximum inverter capacity to the power grid system (i.e., during daytime). to damp subsynchronous oscillations utilizing the same concept of damping of power oscillations already described above.

Several other embodiments of solar farm operating as a STATCOM both during nighttime and daytime, for damping power oscillations and for damping subsynchronous oscillations are described in [7].

Frequency deviations occur in a power system when a system disturbance such as a fault causes an imbalance between the power generation and loads. Conventionally frequency is controlled through active power control of power generation sources including inverter-based power generation sources.

In another aspect of this invention, a photovoltaic solar farm can be operated as a STATCOM to regulate power system frequency through reactive power control when it is performing at least one of: i) not providing active power to the power grid system (i.e., during nighttime), or ii) providing active power less than a maximum inverter capacity to the power grid system (i.e., during daytime). The solar farm can control the PCC voltage through reactive power control. Since several power system loads are a function of voltage, control of solar farm PCC voltage effectively controls the power consumption of the loads. This control indirectly reduces the imbalance between the power generation and loads in a power system, thereby contributing to frequency regulation.

In summary, the present invention provides numerous novel embodiments involving the use of a solar farm as a STATCOM in a distributed power generation network and additional functions through controlled reactive power injection, and in particular:

The Solar farm can be utilized as a STATCOM for grid voltage control allowing the integration of an increased number of wind turbine generators and other renewable/non-renewable distributed generators in the transmission/distribution line.

The solar farm can be operated as a STATCOM to increase the power transmission capacity of transmission lines to which they are connected. Increasing transmission capacity is a great challenge faced by electric power utilities around the globe. PV Solar farms can play that role both during nights as well as during the days.

The solar farm can be operated as a STATCOM to improve the system stability thereby helping prevent blackout scenarios.

The solar farm can be operated as a STATCOM to enhance the damping of low frequency (0.2-2 Hz) power oscillations thus helping increase the power flows in transmission systems. This problem exists in several countries around the world.

Synchronous generators that are connected to series compensated transmission lines to increase the power transmission capacity but are subjected to the problem of sub-synchronous resonance (SSR) that if uncontrolled, can result in enormously expensive generator shaft failures/breakages. If a solar farm is located close to synchronous generator, it can be operated as a STATCOM to mitigate sub-synchronous resonance.

A solar farm connected in the same series compensated network as synchronous generators, wind farms or HVDC systems can be operated as a STATCOM both during night and day to damp subsynchronous oscillations in any of synchronous generators, wind farms or HVDC systems.

Alleviation of voltage instability: systems having large reactive power consuming loads such as induction motor loads, steel rolling mills, etc., are subject to the problem of voltage instability (sudden reduction/collapse of the bus voltage) under line outages, or faults. Solar farms in the vicinity of such loads can be operated as a STATCOM to provide very rapid voltage support to mitigate this problem of voltage collapse.

Frequency regulation: The solar farm can be operated as a STATCOM to provide frequency regulation through reactive power control.

Limiting short circuit currents: transmission and distribution networks are facing a huge problem of high short circuit currents as new renewable/non-renewable energy sources are being connected to the grid, as each source contributes to current in the faulted network. The solar farms inverter can be operated in an entirely novel manner to operate as a rectifier during the short circuits to thereby suck the fault current back from the fault and charging its own capacitor. In this manner the PV solar farms will allow more connections of new generating sources in the grid.

Improvement of High Voltage Direct Current (HVDC) converter terminal performance: solar farms near HVDC lines can provide dynamic voltage support to successfully operate the HVDC converters even under very stringent (weak) network conditions Solar farms as STATCOMs can provide the low voltage ride through (LVRT) capability for successfully integrating wind farms. During faults the line voltage reduces to very low values causing the nearby wind farms to get disconnected. Solar farms can provide voltage support during these situations to allow the wind farms to remain connected and continue to supply power to the grid.

The PV solar farm can act as an Active Power Filter to perform power factor correction, balancing of unsymmetrical loads and line current harmonic compensation, all in coordination with the abovementioned functions of FACTS.

All of the above objectives can be achieved during the daytime also by solar farms.

If the PV solar farms are provided with energy storage capability in the form of storage batteries, the solar farm can be utilized as a battery charger during nighttimes when there is excess power production by neighbouring wind farms and the loads are much less. This stored power can be sold to the grid during daytime when needed by the grid at very attractive prices.

Such energy storage will also help shave the peak power demand in electrical networks. During peak hours, instead of the grid importing power at high rates, it can buy stored power from solar farms to meet the peak demands. This application will be in limited situations when the solar farm is not producing its peak/rated power, but still be very valuable.

In addition to the above, there are many other advantages to utilizing a voltage control and a damping control on an inverter-based DG (both PV solar and wind) for improving the transient stability and, consequently, the power transmission limit in transmission systems. A number of these reasons are:

The solar DG, which is presently not at all utilized at night times, can now be utilized with the proposed voltage and damping control to increase the power transmission limit significantly at night-times. Even during daytime when the solar DG produces a large magnitude of real power, the controllers can help increase the stable transmission limit to a substantial degree. The choice of the voltage reference in the voltage controller must be made judiciously to get the maximum improvement in power transfer. For the study system I, a 100 MW solar farm can increase transmission limit by about 200 MW in the night and by 97 MW during the daytime.

When both solar and wind DGs, of 100 MW each, are connected to the system operating with the damping control, the transmission capacity is seen to increase by 240 MW if no DGs are producing real power output, and by 141 MW if both are producing a high level of real power of 94 MW.

When both solar and wind DGs are connected to the system, operating with the damping control, and only one DG is producing real power, the power transfer limit increases even further by at least 356 MW.

The DG FACTS devices of the present invention improve the transient stability and, consequently, the power transfer limit of the grid. These can also be used to provide other functionalities of the FACTS devices.

Embodiments of the present invention are fully extendable to other inverter-based DGs, such as Doubly Fed Induction Generator (DFIG) based wind turbine generators.

According to this at least some aspects of the present invention, a photovoltaic solar farm can provide various functions of a STATCOM when it is performing at least one of: i) not providing active power to the power grid system (i.e., during nighttime), or ii) providing active power less than a maximum inverter capacity to the power grid system (i.e., during daytime), in coordination with at least one inverter of another inverter based distributed power generation system, where another inverter based distributed power generation system may or may not be controlled as a STATCOM to provide the various STATCOM functions, and where another inverter based distributed power generation system includes at least one of:

i) a photovoltaic solar farm,
ii) a wind farm,
iii) a fuel cell system,
iv) a battery energy storage system,
v) an electric vehicle charging system,
vi) any other energy storage system,
vii) any other inverter-based power generation system, or
viii) any combination of the above.

According to other aspects of the present invention, a photovoltaic solar farm can provide various functions of a STATCOM when it is performing at least one of: i) not providing active power to the power grid system (i.e., during nighttime), or ii) providing active power less than a maximum inverter capacity to the power grid system (i.e., during daytime) in a power grid system where the power grid system is any one or more of:

i) a power transmission system,
ii) a power distribution system,
iii) a microgrid system, or
iv) any combination of the above.

According to this invention, a photovoltaic solar farm can provide various functions of a STATCOM when it is performing at least one of: i) not providing active power to the power grid system (i.e., during nighttime), or ii) providing active power less than a maximum inverter capacity to the power grid system (i.e., during daytime) in a power grid system regardless of the type of inverters employed in the solar farm. The type of inverters includes but are not limited to: i) three phase central inverters, ii) three phase string inverters, iii) hybrid inverters, iv) single phase inverters, v) microinverters, etc.

The solar farm DG can generate further revenue for its operators by being operated as a STATCOM. As noted above, the STATCOM-operated solar farm can increase the transmission capacity of power transmission systems. By charging a suitable fee to the operators of wind farm DGs coupled to the transmission system or to the operators of utility companies for increases in the transmission capacity of the transmission system, operators of the solar farm DG can share in the financial benefits of the increased transmission capacity. This method would entail operating the solar farm DG as a STATCOM at night or whenever the solar farm inverter is not being fully utilized in real power generation and charging utilities or the other energy farm operators for the benefit of increased transmission capacity. Of course, the charges could be based on a percentage of increase in the transmission capacity, on the amount of time the solar farm DG is being used to the benefit of the other energy farm DGs, or any other combination of factors.

Further revenue can be generated by solar energy farms by charging utility companies or other interested parties for using the solar energy farms for transmission and distribution grid voltage control. As noted above, inverter equipped solar energy farms, when operated as STATCOM, provides voltage control for the power transmission grid and allows for more wind farms to be coupled to the same grid to which the solar farms are coupled. By providing for more wind energy farms to be connected to the transmission grid without having to invest in dedicated voltage regulating equipment, wind energy farm operators as well as power utility companies save on capital expenditures. As such, solar farm energy operators can charge either on-going fees to the wind farm operators/utilities or a flat rate fee for the benefit provided by their inverters used as STATCOMs.

As noted above, for a better understanding of the present invention, the following references may be consulted. Each of these references is hereby incorporated in their entirety by reference.

[1] N. G. Hingorani and L. Gyugyi, Understanding FACTS, IEEE Press, New York, USA, 1999

[2]"Proposed terms and definitions for Flexible AC Transmission System (FACTS)," IEEE Transactions on Power Delivery, vol. 12, pp. 1848-1853, 1997

[3] Prabha Kundur, "Power System Stability and Control" McGraw Hill, 1994

[4] N. Hatziargyriou, J. Milanovic, C. Rahmann et. al., "Definition and Classification of Power System Stability—Revisited & Extended", IEEE Transactions on Power Systems, Vol. 36, No. 4, 2021

[5]"Distribution Feeder Hosting Capacity: What Matters when Planning for DER?," EPRI Palo Alto, CA, White Paper 3002004777, April 2015

[6] Y. Cheng, L. Fan, J. Rose, et. al, "Real-World Subsynchronous Oscillation Events in Power Grids With High Penetrations of Inverter-Based Resources", IEEE Transactions on Power Systems, Vol. 38, No. 1, pp. 316-330, 2023.

[7] Rajiv K. Varma, "Smart Solar PV Inverters with Advanced Grid Support Functionalities", Wiley—IEEE Press, USA, December 2021

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

A person understanding this invention may now conceive of alternative structures and embodiments or variations of the above all of which are intended to fall within the scope of the invention as defined in the claims that follow.

What is claimed is:

1. A control system for use in controlling a photovoltaic solar power generation source operatively coupled to a power grid system at a point of common coupling (PCC), said control system operating within said photovoltaic solar power generation source, wherein, said photovoltaic solar power generation source comprises:

a single voltage inverter which enables said photovoltaic solar power generation source to perform a Static Synchronous Compensator (STATCOM) function of voltage control for preventing a voltage at said PCC from violating a voltage limit, wherein, said control system operates said voltage inverter to perform the STATCOM function during at least one of the following conditions:

a) when a primary energy source of said photovoltaic solar power generation source is not available, b) when the primary energy source of said photovoltaic solar power generation source is available.

2. The control system according to claim 1, wherein said photovoltaic solar power generation source provides said STATCOM function autonomously.

3. The control system according to claim 1, wherein said STATCOM function is performed without curtailment of real power output from the said photovoltaic solar power generation source.

4. The control system according to claim 1, wherein said STATCOM function comprises closed loop automatic voltage control.

5. The control system according to claim 1, further comprising one or more additional inverters, with each inverter capable of providing said STATCOM function, wherein said STATCOM function is performed by at least one inverter.

6. The control system according to claim 1, wherein said STATCOM function is performed by using an inverter capacity that is not utilized for real power generation of at least one inverter.

7. The control system according to claim 1, wherein said control system is used to determine financial compensation to owners of said photovoltaic solar power generation source for providing said STATCOM function of voltage control for preventing a voltage at said PCC from violating a voltage limit.

8. A control system for use in controlling a battery energy storage based distributed power generation source operatively coupled to a power grid system at a point of common coupling (PCC), said control system comprising:

a single voltage inverter provided within the control system and said control system enabling said battery energy storage based distributed power generation source to perform a plurality of dynamic reactive power control based functions including:

i) reactive power set point control, and ii) voltage control, during the conditions:

a) when primary energy source of said battery energy storage based distributed power generation source is not available, and b) when primary energy source of said battery energy storage based distributed power generation source is available;

and wherein, said control system of said battery energy storage based distributed power generation source operates together with at least one inverter of a photovoltaic solar power generation source.

9. The control system according to claim 8, wherein said battery energy storage based power generation source operates as a STATCOM to provide said plurality of dynamic reactive power control based functions, autonomously.

10. The control system according to claim 8, wherein said voltage control function comprises closed loop automatic voltage control to regulate the PCC voltage to a reference value.

11. The control system according to claim 8, wherein said plurality of dynamic reactive power control based functions are performed without curtailment of real power exchange from the said battery energy storage based power generation source.

12. The control system according to claim 8, further comprising one or more additional inverters, with each inverter capable of providing said plurality of dynamic reactive power control based functions, wherein at least one of said plurality of dynamic reactive power control based functions is performed by using an unutilized capacity of at least one inverter.

* * * * *